(12) United States Patent
Schreiber

(10) Patent No.: US 7,010,606 B1
(45) Date of Patent: Mar. 7, 2006

(54) SYSTEM AND METHOD FOR CACHING A NETWORK CONNECTION

(75) Inventor: Robert Walter Schreiber, Elkton, MD (US)

(73) Assignee: International Business Machines Corporation, Armonk, NY (US)

(*) Notice: Subject to any disclaimer, the term of this patent is extended or adjusted under 35 U.S.C. 154(b) by 816 days.

(21) Appl. No.: 09/750,321

(22) Filed: Dec. 29, 2000

Related U.S. Application Data
(60) Provisional application No. 60/209,644, filed on Jun. 5, 2000.

(51) Int. Cl.
 *G06F 13/00* (2006.01)

(52) U.S. Cl. .............................. 709/227; 709/237; 707/2
(58) Field of Classification Search ................. 709/227, 709/237, 217, 218; 707/1, 2, 10
See application file for complete search history.

(56) References Cited

U.S. PATENT DOCUMENTS

| | | | |
|---|---|---|---|
| 4,956,774 A | 9/1990 | Shibamiya et al. ............ 707/2 |
| 5,303,367 A | 4/1994 | Leenstra, Sr. et al. | |
| 5,345,587 A | 9/1994 | Fehskens et al. | |
| 5,388,196 A | 2/1995 | Pajak et al. | |
| 5,414,812 A | 5/1995 | Filip et al. .............. 707/103 R |
| 5,542,089 A | 7/1996 | Lindsay et al. | |
| 5,568,639 A | 10/1996 | Wilcox et al. | |
| 5,617,119 A | 4/1997 | Briggs et al. ................ 345/611 |

(Continued)

OTHER PUBLICATIONS

Arie Shoshani, "OLAP and Statistical Databases: Similarities and Differences", *ACM*, Jun. 1997, pp. 185–196.

Michael V. Mannino et al., "Statistical Profile Estimation in Database Systems", *ACM Computing Surveys*, vol. 20, No. 3, Sep. 1988, pp. 191–221.

(Continued)

*Primary Examiner*—Kenneth R. Coulter
(74) *Attorney, Agent, or Firm*—Pillsbury Winthrop Shaw Pittman LLP

(57) ABSTRACT

The invention relates to a system and method for caching a network connection. The system sustains connections between a server and one or more back-end databases. The server may establish multiple connections with one or more back-end databases based on data requests from one or more users. The server may determine one or more back-end databases from which the data requests may be satisfied. After receiving the data, the users, using an end-user device, may request disconnection of a connection between the end-user device and the server. The server, however, sustains the connection with the back-end database from which the data was retrieved. The server may use this connection to satisfy other data requests without re-establishing a connection with that back-end database.

20 Claims, 18 Drawing Sheets

U.S. PATENT DOCUMENTS

| | | | | |
|---|---|---|---|---|
| 5,630,125 | A | 5/1997 | Zellweger | |
| 5,724,577 | A | 3/1998 | Exley et al. | |
| 5,727,196 | A | 3/1998 | Strauss, Jr. et al. | |
| 5,745,737 | A | 4/1998 | Kayes et al. | |
| 5,752,241 | A | 5/1998 | Cohen | 707/3 |
| 5,754,493 | A | 5/1998 | Al-Chalabi | 367/38 |
| 5,754,849 | A | 5/1998 | Dyer et al. | |
| 5,781,757 | A | 7/1998 | Deshpande | |
| 5,790,804 | A | 8/1998 | Osborne | |
| 5,794,232 | A | 8/1998 | Mahlum et al. | 707/3 |
| 5,801,702 | A | 9/1998 | Dolan et al. | |
| 5,805,860 | A | 9/1998 | Parham | 716/12 |
| 5,809,523 | A | 9/1998 | Kayes et al. | |
| 5,842,223 | A | 11/1998 | Bristor | |
| 5,850,544 | A | 12/1998 | Parvathaneny et al. | |
| 5,852,717 | A | 12/1998 | Bhide et al. | |
| 5,870,546 | A | 2/1999 | Kirsch | |
| 5,873,087 | A | 2/1999 | Brosda et al. | |
| 5,875,446 | A | 2/1999 | Brown et al. | 707/3 |
| 5,893,120 | A | 4/1999 | Nemes | |
| 5,897,636 | A | 4/1999 | Kaeser | |
| 5,933,842 | A | 8/1999 | Ross | |
| 5,940,855 | A | 8/1999 | Kayes et al. | |
| 5,944,780 | A | 8/1999 | Chase et al. | |
| 5,956,730 | A | 9/1999 | Burroughs et al. | |
| 5,960,423 | A | 9/1999 | Chaudhuri et al. | |
| 5,960,433 | A | 9/1999 | Fujii et al. | |
| 5,963,961 | A | 10/1999 | Cannon et al. | |
| 5,974,418 | A | 10/1999 | Blinn et al. | 707/100 |
| 5,977,890 | A | 11/1999 | Rigoutsos et al. | |
| 5,983,234 | A | 11/1999 | Tietjen et al. | 707/103 |
| 5,987,472 | A | 11/1999 | Serafin | 707/104 |
| 5,991,765 | A | 11/1999 | Vethe | |
| 6,006,232 | A | 12/1999 | Lyons | |
| 6,006,234 | A | 12/1999 | Govindarajan et al. | |
| 6,009,422 | A | 12/1999 | Ciccarelli | 707/4 |
| 6,009,435 | A | 12/1999 | Taubin et al. | |
| 6,014,670 | A | 1/2000 | Zamanian et al. | |
| 6,016,493 | A | 1/2000 | Burrows | |
| 6,026,410 | A | 2/2000 | Allen et al. | 707/104 |
| 6,026,467 | A | 2/2000 | Petty | |
| 6,032,147 | A | 2/2000 | Williams et al. | |
| 6,034,697 | A | 3/2000 | Becker | 345/433 |
| 6,047,356 | A | 4/2000 | Anderson et al. | |
| 6,049,799 | A | 4/2000 | Mangat et al. | 707/10 |
| 6,052,689 | A | 4/2000 | Muthukrishnan et al. | |
| 6,055,527 | A | 4/2000 | Badger et al. | |
| 6,081,774 | A | 6/2000 | de Hita et al. | 704/9 |
| 6,085,188 | A | 7/2000 | Bachmann et al. | 707/3 |
| 6,092,063 | A | * 7/2000 | Cheng et al. | 707/2 |
| 6,094,651 | A | 7/2000 | Agrawal et al. | 707/5 |
| 6,101,500 | A | 8/2000 | Lau | 707/103 |
| 6,101,556 | A | 8/2000 | Piskiel et al. | |
| 6,112,196 | A | * 8/2000 | Zimowski et al. | 707/2 |
| 6,182,060 | B1 | 1/2001 | Hedgcock et al. | 707/1 |
| 6,189,012 | B1 | 2/2001 | Mital et al. | 707/103 |
| 6,191,790 | B1 | 2/2001 | Bogdan | 345/426 |
| 6,192,373 | B1 | 2/2001 | Haegele | 707/104 |
| 6,199,059 | B1 | 3/2001 | Dahan et al. | 707/3 |
| 6,226,640 | B1 | 5/2001 | Ostrovsky et al. | 707/5 |
| 6,243,723 | B1 | 6/2001 | Ikeda et al. | 707/514 |
| 6,278,992 | B1 | 8/2001 | Curtis et al. | 707/3 |
| 6,327,593 | B1 | 12/2001 | Goiffon | 707/102 |
| 6,347,312 | B1 | 2/2002 | Byrne et al. | 707/3 |
| 6,349,275 | B1 | 2/2002 | Schumacher et al. | 704/8 |
| 6,381,605 | B1 | 4/2002 | Kothuri et al. | 707/100 |
| 6,388,592 | B1 | 5/2002 | Natarajan | 341/107 |
| 6,392,667 | B1 | 5/2002 | McKinnon et al. | 345/738 |
| 6,397,222 | B1 | 5/2002 | Zellweger | 707/102 |
| 6,415,250 | B1 | 7/2002 | van den Akker | 704/9 |
| 6,421,656 | B1 | 7/2002 | Cheng et al. | 707/2 |
| 6,434,543 | B1 | * 8/2002 | Goldberg et al. | 707/2 |
| 6,434,745 | B1 | 8/2002 | Conley, Jr. et al. | 717/177 |
| 6,438,549 | B1 | 8/2002 | Aldred et al. | 707/9 |
| 6,442,566 | B1 | 8/2002 | Atman et al. | 707/103 |
| 6,466,933 | B1 | 10/2002 | Huang et al. | 707/3 |
| 6,470,330 | B1 | 10/2002 | Das et al. | 707/2 |
| 6,493,750 | B1 | 12/2002 | Mathew et al. | 709/220 |
| 6,498,921 | B1 | 12/2002 | Ho et al. | 434/362 |
| 6,529,914 | B1 | 3/2003 | Doan et al. | 707/1 |
| 6,539,383 | B1 | 3/2003 | Charlet et al. | 707/10 |
| 6,571,282 | B1 | 5/2003 | Bowman-Amuah | 709/219 |
| 6,611,837 | B1 | 8/2003 | Schreiber | 707/100 |
| 6,629,132 | B1 | 9/2003 | Ganguly et al. | 709/213 |
| 6,665,674 | B1 | 12/2003 | Buchanan et al. | 707/10 |
| 6,836,776 | B1 | * 12/2004 | Schreiber | 707/100 |
| 2002/0091696 | A1 | 7/2002 | Craft et al. | 707/10 |

OTHER PUBLICATIONS

Wei Wang et al., "An Approach to Active Spatial Data Mining Based on Statistical Information", *IEEE Transactions on Knowledge and Data Engineering*, vol. 12, No. 5, Sep./Oct. 2000, pp. 715–728.

Francesco M. Malvestuto, "A Universal–Scheme Approach to Statistical Databases Containing Homogeneous Summary Tables", *ACM Transactions on Database Systems*, vol. 18, No. 4, Dec. 1993, pp. 678–708.

Peter Pin–Shan Chen, "The Entity–Relationship Model–Toward a Unified View of Data", *ACM*, vol. 1, Mar. 1976, pp. 9–36.

* cited by examiner

SYSTEM AND METHOD FOR CACHING A NETWORK CONNECTION

RELATED APPLICATIONS

This application claims priority from U.S. Provisional Patent Application Ser. No. 60/209,644, filed Jun. 5, 2000, and entitled "Low-Overhead Hierarchical-Caching-Object Storage Toolkit." This application is also related to U.S. patent application Ser. No. 09/750,298, filed Dec. 29, 2000, now U.S. Pat. No. 6,745,189, and entitled "System and Method for Enabling Multi-Indexing of Objects;" U.S. patent application Ser. No. 09/750,315, filed Dec. 29, 2000, and entitled "System and Method for Searching Extended Regular Expressions;" U.S. patent application Ser. No. 09/750,317, filed Dec. 29, 2000, and entitled "System and Method for Enabling Statistical Matching;" U.S. patent application Ser. No. 09/750,318, filed Dec. 29, 2000, now U.S. Pat. No. 6,611,897, and entitled "System and Method for Managing Hierarchical Objects;" U.S. patent application Ser. No. 09/750,319, filed Dec. 29, 2000, and entitled "System and Method for Storing Conceptual Information;" and U.S. patent application Ser. No. 09/750,322, filed Dec. 29, 2000, now U.S. Pat. No. 6,323,328, and entitled "System and Method for Enabling Unified Access to Multiple Types of Data." Each of the applications identified above is herein incorporated by reference.

FIELD OF THE INVENTION

The invention relates to a system and method for caching a network connection. More particularly, the invention relates to a system and method that sustains a connection between a server and a back-end database after a connection between an end-user device and the server has been disconnected.

BACKGROUND OF THE INVENTION

Modern database applications are typically designed using relational data models that are implemented by well known technologies such as DB2. For many applications, a relational data model works well. For some applications, however, the relational database model limits the ability to represent complex conceptual information. Such systems typically store data in tables that include one or more columns. When data is stored in the tables, the data may not occupy all or a portion of one or more columns. Therefore, data storage space that includes unused columns may be unused. Additionally, such systems typically require a new table schema to be defined for each data collection to be saved. Therefore, data to be stored must be assembled by the system to populate the table's schema within the table. Additionally, systems typically only allow navigation through the table in a downward direction.

These tables contain named columns of information and one row for each data observation. Related tables may be joined by one or more columns that contain a common field. The descriptions of all tables, columns, and relationships are contained in the database schema, which is typically maintained by a full-time database administrator (DBA). The definition of new tables, columns, or relationships usually requires the intervention of a DBA.

Many applications typically store dense lists of information, such as financial data or employee records, where most data columns are fully populated. Other applications, such as name and address directories or product catalogues, contain sparse information. That is, out of many potential data elements, only a few may exist in any particular record. Address directories and product catalogues typically maintain relationships, especially inheritances that are usually more easily understood when expressed in hierarchical trees rather than joined relational tables.

Another drawback of existing systems is that data collections to be stored must be transformed to a format compatible with a table to be used to store the data This may require modification of existing schema or reformatting a database to a particular format. This may include reorganization and possible downtime for the database.

Another drawback with existing systems is that multiple disk reads may be necessary for retrieving rows within a table. For example, if a user desires to further limit a search, and the user inserts additional criteria for searching an object, existing systems typically access a server each time an additional search criteria is input. This may slow the performance of the server and increase processing time.

Relational databases are used to store relationships among tables. Relational databases, however, are not very suitable for storing hierarchies. Therefore, hierarchical databases typically are used to store hierarchies. Data elements are stored as fixed lengths. If a data element does not occupy the fixed lengths, the excess data storage space may be wasted.

Existing systems are typically slow to resolve queries. For example, a query may take one hundred (100) milliseconds to be resolved. Another drawback is that applications are typically coded to retrieve one or at most a few attributes on any one server call. This may lead to multiple calls being issued to a server against the same data collection. Furthermore, because only portions of a data collection are retrieved, existing systems typically parse the data collection for particular information being requested. Parsing may occur for each call issued to a server. This may also increase processing time.

These and other drawbacks exist.

SUMMARY OF THE INVENTION

One object of the invention is to overcome these and other drawbacks of the existing systems.

Another object of the invention is to provide a system and method for caching a network connection.

Another object of the invention is to provide a system and method for caching a network connection that sustains a connection between a server and a back-end database after a connection between an end-user device and the server has been disconnected.

Another object of the invention is to provide a system and method for caching a network connection that maintains a record of open connections between the server and one or more back-end databases.

Another object of the invention is to provide a system and method for caching a network connection that references the record of open connections to determine whether a connection to a particular back-end database exists.

Another object of the invention is to provide a system and method for caching a network connection that reduces connection time.

The invention relates to a system and method for caching a network connection. The system sustains connections between a server and one or more back-end databases. The server may establish multiple connections with one or more back-end databases based on data requests from one or more users. The server may determine one or more back-end databases from which the data requests may be satisfied.

After receiving the data, the users, using an end-user device, may request disconnection of a connection between the end-user device and the server. The server, however, sustains the connection with the back-end database from which the data was retrieved. The server may use this connection to satisfy other data requests without re-establishing a connection with that back-end database.

The invention also relates to a system and method for storing and transmitting data. The data may be stored as a hierarchical data list (HDL), hierarchical data container (HDC), or hierarchical data element (HDE). An HDE may include a structure that comprises a 'name', syntax, and value. Additionally, an HDE describes its relationship to sibling objects and/or a parent HDE. One example of an HDE is a linked attribute value pair (LAVP). An HDC is a particular type of HDE that comprises a name and pointers to a list of zero or more HDEs. An example of an HDC is a linked attribute value list (LAVL). An HDL may be an HDC and its collection of zero or more HDEs. An example of and HDL may be an LAVL and zero or more LAVPs.

The invention provides a system and method for representing, storing, transmitting, and retrieving information. The invention uses a hybrid data object containing hierarchical information and references back-end databases that may be stored with one or more keys that are dynamically derived from an HDE's content when the object is stored. The invention enables sufficient storage and retrieval of HDLs using indexing with Structured Query Language (SQL)-like complex query capabilities. Each HDL and HDE may be a self-defining entity. That is, each HDL and HDE contains its own schema. Each HDL may contain information to determine the attributes of the HDL, HDE, and each data element. The invention also enables rapid navigation, transmission, searching, construction, manipulation, and deletion of HDLs and HDEs.

The HDL may include collections of HDEs and possibly, other subordinate HDLs. This recursive data architecture enables complex hierarchies of data objects and enables data inheritance. Navigation through an HDL may be forward, backward, up, or down, through a navigational tree. The HDL may be broken apart and rearranged in any manner desired.

The invention also enables referencing back-end databases such as LDAP, DB2, and Oracle. These data references may be cached and subsequently retrieved without referring to the back-end databases. This enables faster retrieval of the data objects from such systems. A time-to-live for each cache entry may be set individually for each cached HDL. The invention also enables invalidation of a cached reference and rereading of a cached reference regardless of a status of the reference.

Each HDL may be stored as an ordinary "flat file," and may be copied, moved, backed-up, or deleted using known operating system commands. HDLs may also be replicated to remote locations. Preferably, replication is performed in real-time.

Other objects, advantages, and embodiments of the invention are set forth in part in the description that follows and in part will be apparent to one of ordinary skill in the art.

DETAILED DESCRIPTION OF PREFERRED EMBODIMENTS

The invention relates to a system and method for caching a network connection. The invention sustains a connection between a server and a back-end database after a connection between the server and an end-user device has been disconnected.

Figure 1:
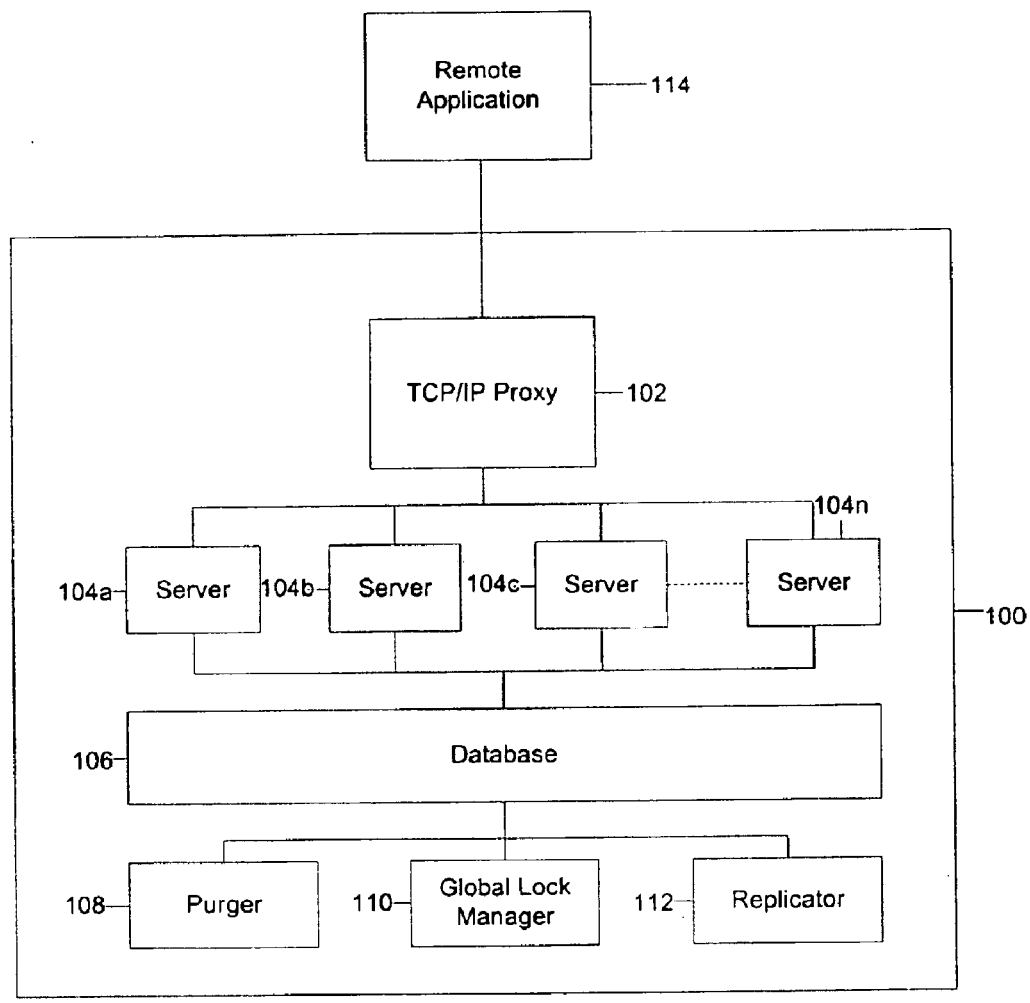
FIG. 1 is a schematic block diagram of a system for storing and transmitting HDLs according to one embodiment of the invention.

FIG. 1 is a schematic block diagram of an overall system for storing hierarchical objects according to one embodiment of the invention. The system includes a host computer 100 that includes transmission control protocol/Internet protocol (TCP/IP) proxy 102, one or more servers 104a–104n, database 106, purger 108, global lock manager 110, and replicator 112. The system may also include a remote application 114 that is in communication with host computer 100.

TCP/IP proxy 102 enables host computer 100 to accept a TCP/IP connection. After a TCP/IP connection is made with TCP/IP proxy 102, the connection may be communicated to a server process. This enables TCP/IP proxy 102 to shield each server process from a potential failure in any other server process. Servers 104a–104n may be used to maintain one or more TCP/IP connections. Servers 104a–104n may be in communication with database 106 and may operate independent of each other to reduce a chance of failure. Additionally, using this configuration, data corruption is reduced.

Data corruption reduction is possible because each location on a server may have a corresponding code location for code that may modify only that particular location. Therefore, the code may not be used to modify other locations that may be referenced by other processes of the server that require updates. Additionally, a server may have multiple locations having the same name. Therefore, by limiting a location that the code may modify, this reduces modification errors by modifying a location not intending to be modified. For example, if a server includes two (2) locations "1000" and a single code for modifying both locations, the code may modify an incorrect location. This increases a likelihood of incorrect data being processed. By using only a single code for each location, this reduces a chance for data being corrupted.

Purger 108 may receive requests from one or more of servers 104a–104n to schedule automatic deletion of objects within database 106. For example, an application may schedule deletion of one or more HDLs two (2) weeks after creation. Purger 108 may be used to delete HDLs that have been designated to be deleted after a predetermined time period.

Purger 108 may also be used to delete one or more HDLs after a last use expiration. For example, an HDL may be scheduled for deletion after two weeks. If a user modifies the HDL a day before the expiration of the two weeks, the HDL may still be deleted after the two weeks has expired. Therefore, an HDL that may be desired to be retained may be deleted. Thus, purger 108 may be set to delete an HDL two weeks after a last use of the HDL. In this manner, HDLs may not be deleted if the HDL is still in use. For example, purger 108 may be set to delete an HDL two weeks after a last use as opposed to two weeks after creation.

Global lock manager 110 may be used to coordinate explicit record locking requests from remote application 114. A record lock request may be a request from a user to prohibit one or more other users from accessing a particular object. A lock may be shared or exclusive, have a wait time that controls how long an application may wait before obtaining a lock, or have an expiration time that controls when a lock may be automatically released. Global lock manager 110 may also dynamically display currently held and pending locks.

Replicator 112 may be used to communicate, for example, using MQ Series, with other replicators. For example, replicator 112 may replicate HDLs during an insert command. The insert operation may provide a name of a list of instances that may receive a copy of the HDL. A list-of-lists may also be allowed and may be reduced and edited to reduce multiple insertions at a single instance. The list-of-lists may be recursive.

Figure 2:
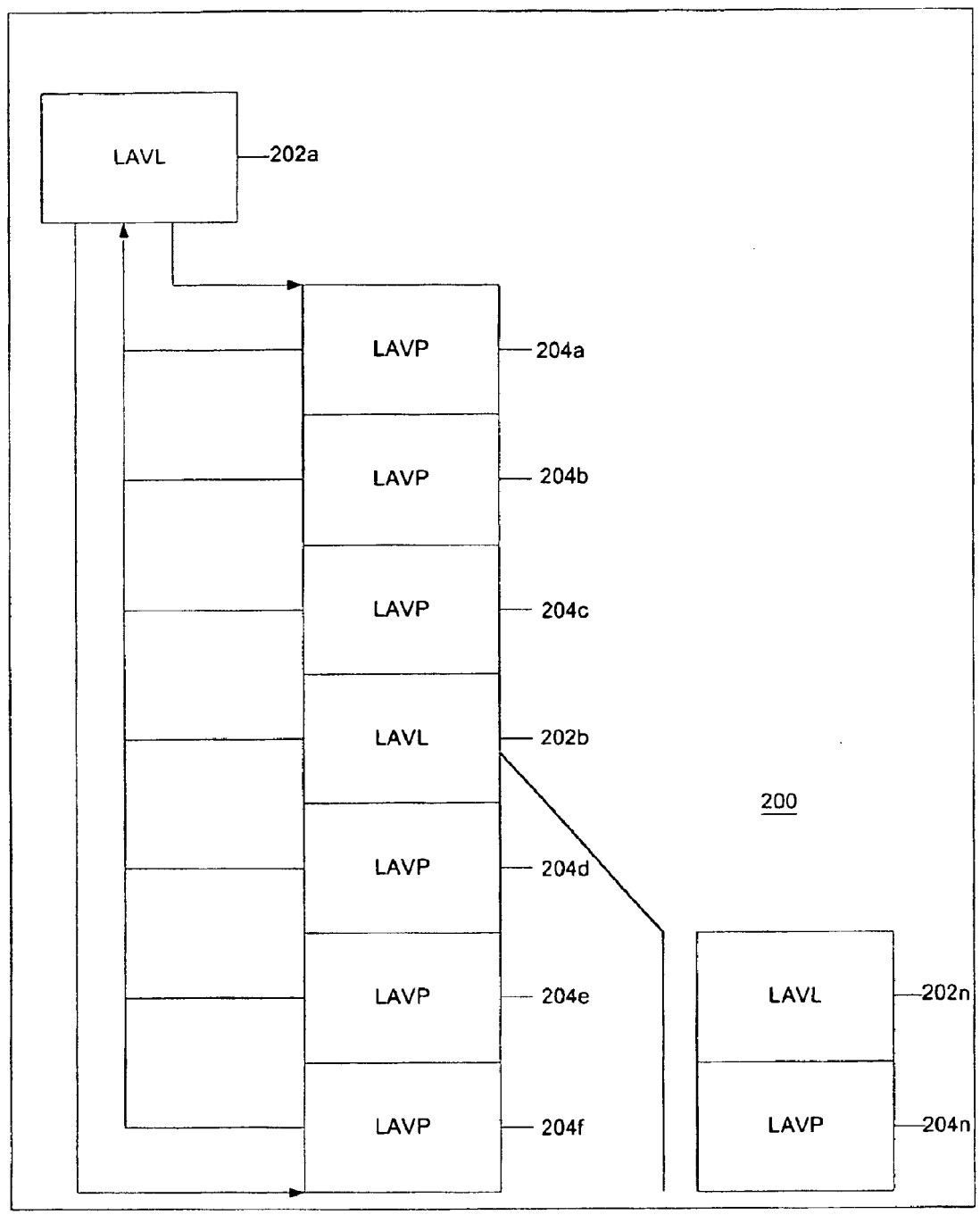
FIG. 2 is a schematic block diagram of a system for storing and transmitting HDLs according to one embodiment of the invention.

FIG. 2 is a schematic block diagram of an HDL 200 stored according to one embodiment of the invention. HDL 200 may include HDCs embodied as linked attribute value lists (LAVL) 202a–202n and linked attribute value pairs (LAVP) 204a–204n. LAVLs 202a–202n may be a list of zero (0) or more LAVPs 204a–204n. LAVLs 202a–202n may function as a parent for LAVPs 204a–204n. An LAVL may contain another LAVL. Therefore, a hierarchical structure may be built to any level of complexity. For example, an inheritance model may be created for a particular data structure.

Figure 3A:
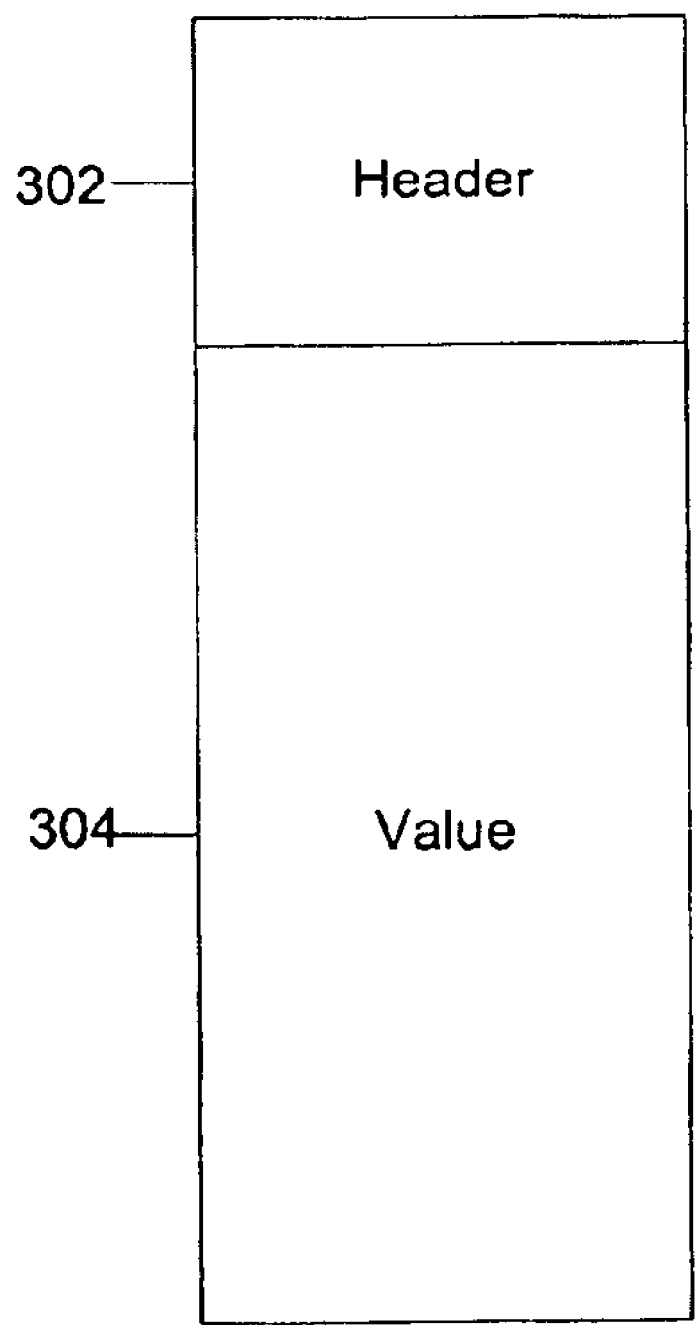
FIG. 3A is a schematic block diagram of an HDL according to one embodiment of the invention.

Each LAVP 204a–204n may include a header 302 and value 304 as shown in FIG. 3A. Value 304 may contain zero (0) or more bytes of data. The length of the value may be stored in header 302. Each header may have a syntax describing a format of the value. For example, a value may be an Integer, Unicode string, Timevalue, or application defined. An LAVP may be six (6) words plus the content of the header length field. Preferably, header 302 includes at least six (6) words. Header 302 may be used to identify an attribute of an HDL and its relationship to other attributes.

Figure 3B:
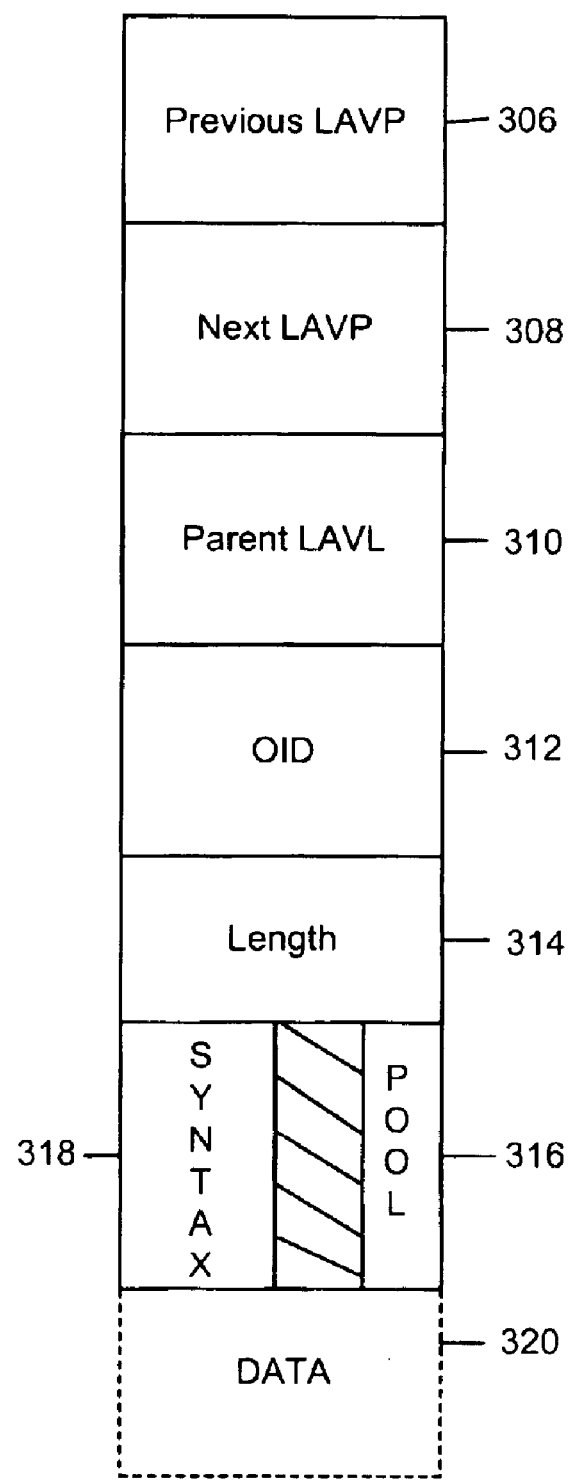
FIG. 3B is a schematic block diagram of an HDL stored according to one embodiment of the invention.

Header 302 may include a previous LAVP 306, next LAVP 308, parent LAVL 310, OID 312, length 314, pool ID 316, syntax 318, and data 320 as shown in FIG. 3B. Previous LAVP 306, next LAVP 308, and parent LAVL 310 may be used as pointers to other LAVPs and LAVLs. Previous LAVP 306, next LAVP 308, and parent LAVL 310 may be implemented as relative offsets rather than actual pointers. For example, previous LAVP 306 may refer to the previous LAVP by a distance in bytes rather than location of the previous LAVP. Implementing previous LAVP 306, next LAVP 308, and parent LAVL 310 as relative offsets facilitates placing objects in shared memory segments and memory mapped disk files and transmission. By using relative offsets, an object may be referenced by different addresses and different processes in the same or other systems. Therefore, LAVLs and LAVPs may not be required to be moved to different storage locations and may reside in any place in memory. If an LAVP is not a member of an LAVL, previous LAVP 306, next LAVP 308, and parent LAVL 310 may be designated as null, for example, −1.

For an integer value defined using the following code:

define my_oid 0x00040005 ost_create_int (my_oid, 27);

previous LAVP 306, next LAVP 308, and parent LAVL 310 may have a −1 value indicating a null value, OID 312 may have a 0x00040005 value, length 314 may have a 4 value, pool 316 may have a zero (0) value, syntax 318 may have an ost_syntax_sint32 value, and an additional element 320 storing the integer value, that is, 27, may also be included.

Code for carrying out the invention may include various classes of calls. For example, the classes may include creation, identification, navigation, searching, comparison, manipulation, displaying/debugging, and destruction. The creation class may include a create call, the identification may include an OID, syntax, length call, navigation may include a previous, next, parent, first, last, scan, and traverse calls, searching may include a locate call, manipulation may include a join, weave, merge, unchain, and add calls, and the destruction class may include a free call.

The following are examples of code that may be used for carrying out the invention. Although the examples are written in C language, other computer languages may also be used. Preferably the following commands are performed at the hardware level of a system using the invention.

To create an LAVL, the following syntax may be used:

include <ost_lavls.h>

Lavl*ost_create_lavl (Oid)

Oid oid;

This function may be used to create an LAVL as shown in FIG. 3B. The returned LAVL pointer contains the address of a LAVL with the given OID. The LAVL may not be chained to any other LAVPs and contain no children. In other words the Previous, Next, LAVL, Parent, Head, and Tail pointers are NULL. OID may be an object identifier, for example, a name of an LAVL to be created.

To create a real value LAVP, the following syntax may be used:

include <ost_lavls.h>

Lavp*ost_create_real (oid, value, tolerance, Unitid)

Oid oid;

double value;

Uint16 tolerance

Uint16 UnitID

This function creates a real value LAVP. The value may be described with a tolerance and a UnitID. The value may be the most likely value of the data. The tolerance represents a percentage error that may be expected not to exceed 95% of the time. The tolerance may be a 16 bit unsigned number that represents 1/1000ths of a percent. This implies that the smallest tolerance is 0% and the largest tolerance is +/−65.535%.

Pre-defined values for common tolerances may be:

| #define MATCH_EXACTLY | 0/* | 0% | */ |
| #define MATCH_NEARLY | 1000/* | 1% | */ |
| #define MATCH_CLOSETO | 2000/* | 2% | */ |
| #define MATCH_APPROXIMATELY | 5000/* | 5% | */ |
| #define MATCH_AROUND | 10000/* | 10% | */ |
| #define MATCH_ROUGHLY | 25000/* | 25% | */ |

The UnitID may be a number from 1 to 499 that represents the dimension of the value. UnitIDs may be found in 'NAME' records of the OST configuration and the ost_clientlib.h C language file.

Example: To create a real value of 160+/−1% pounds:

ost_create_real (WEIGHT_OID, 160.0, MATCH_NEARLY, OST_UNIT_pounds);

Character strings may be represented by a variety of syntaxes that indicate a character set and an LAVP value area that may include a one (1) word length followed by characters. A request for an LAVP's value length may be the length of a value area, not the length of the string contained therein. There may be two (2) basic types of calls to create character strings. The first:

LAVP*0ST_Create_XXXXXX (Oid oid, char*text); may be used to create a string LAVP from a null terminated string.

The second:

LAVP*0ST_create_XXXXXX (Oid, oid, char*text, Sint 32 length), may be used to create a string from a non-null terminated string.

To create an integer LAVP, the following code may be used:

define my_oid 0x00040005 ost_create_int (my oid, 27);

To create a unicode string LAVP from an ASCII string, the following syntax may be used:

include <ost_lavls.h>

Lavp*ost_create_unicode_from_ascii (my_oid, "This is text")

Lavp*ost_create_unicode_from_ascii (my_oid, "This is text", 12)

Oid oid;

char*test;

Sint32 Length;

In this example, a header 302 of an LAVP may include the following:

previous LAVP 306, next LAVP 308, and parent LAVP 310 may have −1 values, OID 312 may have a 0x00040005 value, length 314 may have a value of 28 or more, pool 316 may have a zero (0) value, and syntax 318 may have an ost_syntax_unicode value. A value 304 of the LAVP may have a 12 value and text including $_0T_0H_0I_0S_08_0I_0S_08_0T_0E_0X_0T$.

To create an LAVP that contains a numeric value, the following syntax may be used:

include <ost_lavls.h>

Lavp*ost_create_time_gmt(oid,time)

Oid oid;

Timeval time;

This function may be called to create an LAVP with syntax OST_SYNTAX_TIME,GMT. The time argument may be interpreted in two ways:

An absolute time, then the time value represents the number of microseconds since Jan. 0, 1970. The time may be represented as a relative time. For example, 5:30. That is, 5 and one-half hours from a given time. Time values may be added or subtracted to obtain other absolute or relative time values. An absolute value may be added to a relative time value to obtain an absolute time value. For example, an absolute time value of Jan. 1, 1970, plus a relative time value of five (5) and one-half hours yields an absolute time value of Jan. 1, 1970, 5:30 a.m. Absolute time values may be subtracted from another absolute time value to produce a relative time value. The relative time value may be an amount of time between the two absolute time values. Additionally, relative time values may be added to each other to produce another relative time value.

To create an LAVP that contains a numeric value, the following syntax may be used:

include <ost_lavls.h>

Lavp*ost_create_time_gmt (oid, time)

Oid oid;

Timeval time;

To create a character string LAVP, the following syntax may be used:

include <ost_lavls.h>

Lavp*ost_create_ascii (oid, text);

Lavp*ost_create_ascii (oid, text, textlen);

Lavp*ost_create_cp850 (oid, test);

Lavp*ost_create_cp850 (oid, text, textlen);

Lavp*ost_create_ebcdic (oid, text);

Lavp*ost_create_ebcdic (oid, text, textlen);

Lavp*ost_create_hexdata (oid, text);

Lavp*ost_create_hexdata (oid, text textlen);

Lavp*ost_create_ia5 (oid, text);

Lavp*ost_create_ia5 (oid, text, textlen);

Lavp*ost_create_iso6937 (oid, text);

Lavp*ost_create_iso6937 (oid, text, textlen);

Lavp*ost_create_iso88591(oid, text);

Lavp*ost_create_iso88591 (oid, text, textlen);

Lavp*ost_create_iso88592 (oid, text);

Lavp*ost_create_iso88592 (oid, text, textien);

Lavp*ost_create_iso88593 (oid, text);

Lavp*ost_create_iso88593 (oid, text, textlen);
Lavp*ost_create_iso88594 (oid, text);
Lavp*ost_create_iso88594 (oid, text, textlen);
Lavp*ost_create_iso88595 (oid, text);
Lavp*ost_create_iso88595 (oid, text, textlen);
Lavp*ost_create_iso88596 (oid, text);
Lavp*ost_create_iso88596 (oid, text, textlen);
Lavp*ost_create_iso88597 (oid, text);
Lavp*ost_create_iso88597 (oid, text, textlen);
Lavp*ost_create_iso88598 (oid, text);
Lavp*ost_create_iso88598 (oid, text, textlen);
Lavp*ost_create_iso88599 (oid, text);
Lavp*ost_create_iso88599 (oid, text, textlen);
Lavp*ost_create_isot61 (oid, text);
Lavp*ost_create_isot61 (oid, text, textlen);
Lavp*ost_create_numeric (oid, text);
Lavp*ost_create_numeric (oid, text, textlen);
Lavp*ost_create_printabl (oid, text);
Lavp*ost_create_printabl (oid, text, textlen);
Oid oid;
char*text;
Sint32 textlen;

An example of creating an ASCII string, for example, "This is text," may include the following syntax:
ost_create_ascii (my_oid, "This is text")

A header 302 of an LAVP storing this information may include a previous LAVP 306, next LAVP 308, and parent LAVP 310 having −1 values, an OID 312 having a 0x00040005 value, a length 314 value of 16 or more, a pool ID of 0, and a syntax of ost_syntax_ascii. The value 304 of the LAVP may include a 12 value and text including "This is text".

To create a unicode string LAVP from a ASCII string, the following syntax may be used:
include <ost_lavls.h>
Lavp*ost_create_unicode_from_ascii(oid,text)
Lavp*ost_create_unicode_from_ascii(oid,text,length)
Oid oid;
char*text;
Sint32 Length;

To get a syntax of an LAVP, the following syntax may be used:
include <ost_lavls.h>
Syntax ost_syntax(lavp)
Syntax ost_syntax(lavl)
Lavp*lavp;
Lavl*lavl;

The ost_syntax function obtains the syntax of the LAVP. If the argument is a NULL value, for example, −1, a SIGBUS error may result.

To get the address of the previous LAVP in an LAVL, the following syntax may be used:
include <ost_lavls.h>
Lavp*ost_prev(lavp)
Lavp*ost_prev(lavl)
Lavp*lavp;
Lavl*lavl;

The ost_prev function obtains the address of the previous LAVP in a LAVL. If the argument is NULL, is the first LAVP in a LAVL, or the LAVP is not in a LAVL then NULL may be returned.

To get the address of the next LAVP in an LAVL, the following syntax may be used:
include <ost_lavls.h>
Lavp*ost_next(lavp)
Lavp*ost_next(lavl)
Lavp*lavp;
Lavl*lavl;

The ost_next function obtains the address of the next LAVP in a LAVL. If the argument is NULL, is the last LAVP in a LAVL, or the LAVP is not in a LAVL then NULL is returned.

To get the address of a parent LAVL from an LAVP, the following syntax may be used:
include <ost_lavls.h>
Lavl*ost_lavl(lavp)
Lavl*ost_lavl(lavl)
Lavp*lavp;
Lavl*lavl;

The ost_lavl function obtains the address of the parent LAVL for an LAVP. If the argument is NULL or the LAVP is not in a LAVL then NULL is returned.

To search the database for a Real value the following code may be used:
where_clause=ost_EQ( ost_create_real (WEIGHT_OID, MATCH_AROUND, 72.0, OST_UNIT_kilograms));

To add an LAVP to an LAVL, the following syntax may be used:
include <ost_lavls.h>
Lavl*ost_add(existing_lavl,new_lavp)
Lavl*ost_add(existing_lavlnew_lavl)
Lavl*existing_lavl;
Lavp*new_lavp;
Lavl*new_lavl;

This function may be called to add an LAVP or LAVL to a LAVL. The LAVP/LAVL may be from any LAVL that it may be a member of and is rechained to the end (bottom) of the LAVL. If the LAVP is not a member of a LAVL then a simple add may occur. If either operand is NULL then no action may occur.

This function is very commonly used in conjunction with the ost_create_( ) function as follows:

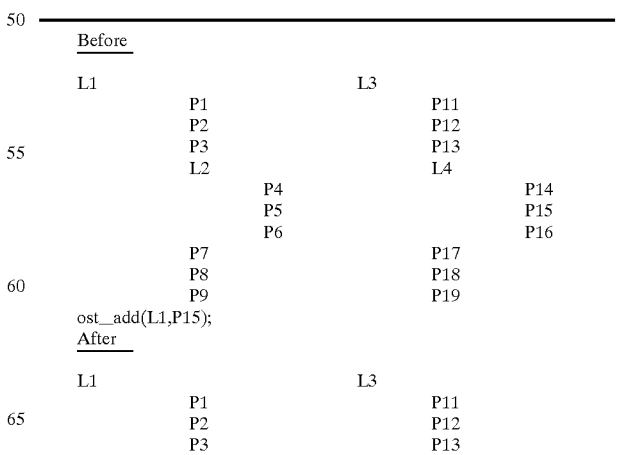

```
Before

L1                                    L3
       P1                                    P11
       P2                                    P12
       P3                                    P13
L2                                    L4
               P4                                    P14
               P5                                    P15
               P6                                    P16
       P7                                    P17
       P8                                    P18
       P9                                    P19
ost_add(L1,P15);
After L1                                    L3
       P1                                    P11
       P2                                    P12
       P3                                    P13
```

-continued

|   | L2 |   | L4 |
|---|----|---|----|
|   | P4 |   | P14 |
|   | P5 |   |     |
|   | P6 |   | P16 |
| P7 |    | P17 |   |
| P8 |    | P18 |   |
| P9 |    | P19 |   |
|   | P15 |   |   |

To disassociate an LAVP or LAVL from a LAVL, the following syntax may be used:

include <ost_lavls.h>
void ost_unchain(lavp)
void ost_unchain(lavl)
Lavp*lavp;
Lavl*lavl;

This function may be used to dissociate an LAVP or LAVL from a LAVL. The LAVL's address may be determined from the LAVP by internally calling ost_lavl(lavp). The LAVL's head and tail may be updated if required and the LAVP's previous and next siblings are rechained together as appropriate. The argument LAVP's LAVL, previous, and next pointers are set to NULL to indicate that the LAVP is no longer a member of any LAVL. The LAVP may be indicated as a loose object if this feature is enabled. The contents of the LAVP may then be preserved.

To display an LAVP or LAVL, the following syntax may be used:

include <ost_lavls.h>
extern FILE*ost_display_FILE;
void ost_display (lavl)
void ost_display (lavp)
Lavl*lavl;
Lavp *lavp;

OID 312 may be used to identify a name of an object. Length 314 may be used to identify a length of the object. Pool ID 316 may be used to identify a group to which that object may be associated. Syntax 318 may be used to identify a format of the LAVL's value. Data 320 may be used to store the LAVL's data. Length 314 may be computed based on value 304 and syntax 318. Pool ID 316 preferably uses an eight (8) bit identification.

Figure 4:
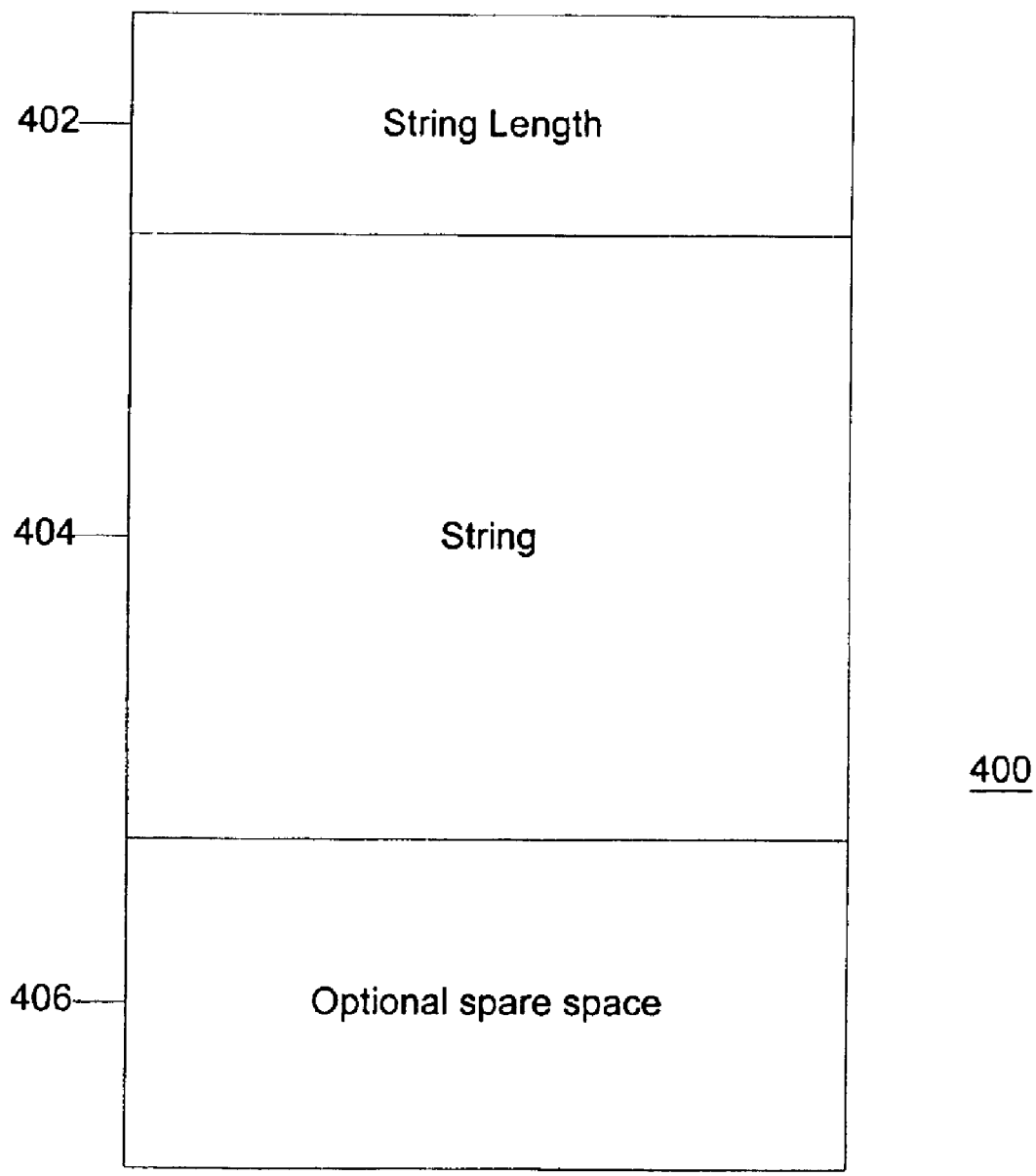
FIG. 4 is a schematic block diagram of a string object stored according to one embodiment of the invention.

FIG. 4 illustrates an LAVP storing a string according to one embodiment of the invention. As shown in FIG. 4, a string object 400 may include string length 402, string 404, and optional spare space 406. String length 402 may be used to identify the length of string 404. Optional spare space 406 may be used to expand string 404 if desired.

Figure 5:
FIG. 5 is an illustration of an HDL according to one embodiment of the invention.

The invention may also enable storing concepts and colors. FIG. 5 illustrates an HDL 500 storing a concept. The concept stored as shown is a man's clothing ensemble. HDL 500 may include all information relating to one ensemble. By storing all the information together as a single object only, a single call from a server to request all or a portion of HDL 500 may be needed. HDL 500 includes the following HDCs: ensemble 502, color 504, shirt 506, pants 508, and shoes 510. HDL 500 also includes the following HDEs: size 512, material 514, sleeve 516, material 518, inseam 520, material 522, size 524, and color-black 526. HDEs 512–516 identify particular criteria for HDC 506. That is, HDEs 512–516 indicate the size, material, and sleeve for shirt 506 in the ensemble. HDEs 518–520 indicate a material and inseam for pants 508 in the ensemble. HDEs 522–526 indicate the material, size, and color for shoes 510 in the ensemble. It should be noted that color HDC 504 indicates a color for each portion of the ensemble following that HDC. HDE 526, however, indicates a particular color for the shoes. Therefore, the color indicated in HDC 504 may be overridden by the color indicated in HDE 526. Each HDC and HDE 504–526 may include descriptions for each portion of the ensemble. Therefore, if a user submits a call, for example, for ensembles having black shoes, HDL 500 may be retrieved. If the user then further desires to view information regarding other portions of ensemble 502, HDL 500 includes all of the information and therefore, the system does not require another call to a server to request any additional information because the information may already be included in HDL 500.

A user may navigate through HDL 500 by drilling-up or drilling-down. For example, for HDE 522, a user may be presented with information regarding HDE 520 or other portion of the ensemble. Although not shown in FIG. 5, the ensemble may also include other information such as, for example, accessories or other clothing.

Additionally, because entire HDL 500 is retrieved, no parsing of the data contained therein may be necessary. The system may not be required to parse through one or more HDLs and determine particular data elements that satisfy a request and retrieve only those data elements. This reduces processing time because parsing of data may not be necessary and drilling-down or up may be performed at a client and not at a server.

Storing conceptual information as a single hierarchical object may decrease retrieval time. As stated above, because all information regarding a particular concept is stored within a single object, the object may be stored locally by an application and is not required to contact a server for retrieving additional information regarding the concept.

As data is stored, an application designer or other user may store data related to a particular concept as a hierarchical tree. The application designer or other user has the flexibility to include as much information as desired into a single object. This flexibility enables application designers or other users to store complete concepts within a single object.

Additionally, HDLs may include references to other HDLs. For example, an HDL that describes a man's clothing ensemble as shown in FIG. 5 may include a reference to an HDL that contains all information regarding another ensemble for a man. This may be performed by inserting a where clause in a code describing the ensemble stored in the HDL that calls another ensemble HDL, retrieves the other ensemble HDL, and inserts that other ensemble HDL into the first ensemble HDL. In this manner, HDLs may include other HDLs as well.

The invention also enables storing colors. Colors may be stored as equations identifying three (3) dimensional color space. Therefore, a color attribute may be ascribed to a particular data element. A color attribute may be stored by identifying a red, green, and blue characteristic of a particular color using a predetermined range of values. For example, each red, green, and blue characteristic of a color may be expressed as a percentage from zero (0) to one-hundred (100). Alternatively, if a color is stored as a one byte of data, each attribute may be assigned a value from zero (0) to two-hundred fifty-five (255). Therefore, red, green, and blue attributes may be described as any relative range of values.

For example, a color having red, green, and blue attributes equal to zero (0) may define a black color. Alternatively, if each red, green, and blue attribute is defined as one-hundred (100) percent of each color, then the color defined may be white. Furthermore, if a color attribute is expressed as fifty (50) percent red, fifty (50) percent green, and fifty (50) percent blue, the color may be gray.

A color attribute may be defined as a distance from each red, green, and blue attribute as shown on a three (3) dimensional color space. Therefore, each color may be defined as:

$$D=\sqrt{(R_1-R_2)^2+(B_1-B_2)^2+(G_1-G_2)^2}$$

where D equals a distance between two (2) colors having R1, B1, G1 and R2, B2, and G2 attributes, respectively. The distance may be defined as the square root of the sum of the squares of the differences of each color component. By having each color component stored as one (1) byte of data, therefore, there may be a total of twenty-four (24) bits that may be used to express a plurality of colors. Thus, at least 16 million different colors may be represented.

The invention also enables statistical matching. Statistical matching may be used to retrieve real values within a predetermined tolerance. For example, an object may be stored that describes properties of a brick. The brick may have a length, width, height, weight, etc. A user may request objects describing a brick that has a weight of five (5) pounds plus or minus five (5) percent. The user may request such information using any known input device, for example, a keyboard, mouse, voice recognition software, touchscreen, etc. The request may be submitted to a server. The server may assume a normal distribution. The server may convert the units of measurement, that is, pounds, into other equivalent units of measurement, for example, kilograms, tons, grams, etc. A normally distributed statistical curve may then be calculated for the tolerance specified.

The statistical curve may be used to determine whether any objects match the user's request. This may be done by calculating a statistical curve for all objects related to the user's request. The statistical curve for the requested objects may then be superimposed on the statistical curve for all of the objects. A match may be determined by an area under both curves within the predefined tolerance. If there are no portions of the curves that overlap within the predefined tolerance, a no match result may be presented to the user. If, however, the curves overlap within the predefined tolerance, a match result may be presented to the user.

Therefore, a statistical curve for a brick weighing five (5) pounds plus or minus five (5) percent would indicate that bricks having a weight in a range of 4.75 pounds to 5.25 pounds are acceptable. The server may then determine objects comprising information relating to bricks having a weight within that range. The server may then return to a user a list of objects that match the requested specification. The objects meeting the specification may also be presented to the user. A match/no match indicator may also be presented to the user. Furthermore, an indication of a number of matching objects out of a total number of objects may also be presented to the user.

As indicated above, the syntax used to search for objects having a particular specification includes a value, tolerance, and unit. The invention may index compatible units. For example, an index for weight may include pounds, kilograms, grams, tons, etc.

The invention also enables fizzy searching capability. An index of real values containing units may be searched. A search argument used for searching the index may include a value, tolerance, and unit. The invention may first convert an index entry and search argument to a standard unit. A decision may then be made depending on a stated tolerance of the index entry and the search argument. The index entry may be assumed to be normally distributed and the tolerance expressed as a percentage may be taken to be the second standard deviation interval (95%). The tolerance may then be used to calculate the statistical probability that an index entry is less than, equal to, or greater than a search argument. A search argument may also contain concepts such as exactly, close to, nearly, approximately, about, and roughly. These concepts may be used in both the storage and retrieval of data and may be pre-set by a system administrator. For example, a system administrator may pre-set a nearby tolerance to one (1) percent, an exactly tolerance to zero (0) percent, an about tolerance to ten (10) percent, etc.

Search arguments may also be used to perform searches on simple indexes, for example, searching a database for names of one or more persons. The syntax for a search command may include the following:

include <ost_clientlib.h>

Lavl*ost_queue_search (session, where_clause)

OST_Session*session;

Lavl*where_clause

The search algorithm may be implemented using Venn Sets. When an object is inserted into the database with the index option enabled, then each eligible OID is indexed. An index may contain a list of each unique value for the OID. For each unique value a list of Object Numbers may be maintained. For example, the following objects may be stored in the database and indexed on GIVENNAME_OID and SURNAME_OID.

```
Object 1
L (FAMILY_OID)
    ASCII (SURNAME_OID) = 'SMITH'
    L (FATHER_OID)
        ASCII (GIVENNAME_OID) = 'JOHN'
    L (MOTHER_OID)
        ASCII (GIVENNAME_OID) = 'JANE'
    L (SON_OID)
        ASCII (GIVENNAME_OID) = 'JOE'
    L (SON_OID)
        ASCII (GIVENNAME_OID) = 'JOSHUA'
    L (DAUGHTER_OID)
        ASCII (GIVENNAME_OID) = 'JANET'
        ASCII (SURNAME_OID) = 'JONES'
    L (DAUGHTER_OID)
        ASCII (GIVENNAME_OID) = 'JULIA'
Object 2
L (FAMILY_OID)
    ASCII (SURNAME_OID) = 'JONES'
    L (FATHER_OID)
        ASCII (GIVENNAME_OID) = 'SAM'
    L (MOTHER_OID)
        ASCII (GIVENNAME_OID) = 'SHIRLEY'
    L (SON_OID)
        ASCII (GIVENNAME_OID) = 'JOE'
    L (SON_OID)
        ASCII (GIVENNAME_OID) = 'SHAWN'
Object 3
L (FAMILEY_OID)
    ASCII (SURNAME_OID) = 'ADDAMS'
    L (FATHER_OID)
        ASCII (GIVENNAME_OID) = 'GOMEZ'
    L (MOTHER_OID)
        ASCII (SURNAME_OID) = 'JONES'
        ASCII (GIVENNAME_OID) = 'MORTICIA'
    L (SON_OID)
        ASCII (GIVENNAME_OID) = 'PUGSLY'
    L (DAUGHTER_OID)
        ASCII (GIVENNAME_OID) = 'WEDNESDAY'
```

A search command may also contain Boolean logic such as "and" and "or." An example of syntax that may be used to create an "and" condition for use in a search argument may be the following:

```
#include <ost_clientlib.h>
Lavl*ost_AND(lavl1, lavl2)
Lavl*lavl1;
Lavl*lavl2;
```

The ost_AND function may create an AND condition in a Search Argument. For example, to express the condition WHERE(GIVENNAME_OID='Jane') AND (SURNAME_OID='Smith), the following code may be used:

```
Lavl*where;
Lavl*arg1;
Lavl*arg2;
arg1=ost_EQ(ost_create_ascii(GIVENNAME_OID, "Jane"));
arg2=ost_EQ(ost_create_ascii(SURNAME_OID, "Smith"));
where=ost_AND(arg1,arg2);
```

To create an "or" condition for use in a search argument, the following syntax may be used:

```
#include <ost_clientlib.h>
Lavl*ost_OR(lavl1,lavl2)
Lavl*lavl1;
Lavl*lavl2;
```

The ost_OR function creates an OR condition in a Search Argument. For example, to express the condition WHERE (GIVENNAME_OID='Jane') OR (SURNAME_OID='Smith'), the following code may be used:

```
Lavl*where;
Lavl*arg1;
Lavl*arg2;
arg1=ost_EQ(ost_create_ascii(GIVENNAME_OID, "Jane"));
arg2=ost_EQ(ost_create_ascii(SURNAME_OID, "Smith"));
where=ost_OR(arg1,arg2);
```

The invention preferably includes units of measurements related to a plurality of measurements and may convert among each unit within a particular category of measurement. The invention preferably includes a units table compiled once and may be edited by a user as needed.

The invention also enables multi-indexing of objects. The objects may be indexed according to ASCII code, string, or other criteria If an object is not indexed, the object is preferably assigned a serial number. An object may include multiple indexes and cells within an index may include multiple values. For example, letters A, B, C, and D may be indexed as R1, R2, R3, and R4, respectively. Letter E, however, may be indexed as R1. Therefore, one cell or record may have multiple aliases. The indexes are preferably created over an entire object, although indexes may be created based on particular fields. Indexes over an entire record, however, may yield broader results for searches performed on the index. For example, a search of an index for families having a female child may yield objects that comprise a mother and a child where the child may not necessarily be female. This may be due to the mother satisfying the female portion of the search request and the child satisfying the child portion of the search request.

The invention also enables creating multi-indexes with one (1) insert. Multi-indexing may be enabled because when an object is created, each HDC and HDE provided in the object may be indexed upon creation of the object. Therefore, it may not be necessary to individually insert one or more HDCs or HDEs from an object into an index. The invention may automatically index each HDC and HDE in an object The invention also enables reference to back end databases such as LDAP, DB2, and Oracle. When referencing an LDAP database, the invention may return LDAP entries as LAVLs rather than Bit Error Rate (BER) encoded strings. This enables navigation among various data elements. Additionally, as described above, the invention may return entire HDLs that include all information relating to a particular data element. This reduces the number of calls needed to be made against a record at a server. Navigation may be performed backward and forward and to detect and process multi-valued LDAP entries.

Another advantage is that the invention automatically distinguishes syntaxes of objects retrieved from a back-end database. The invention also stores the syntax and value for a particular record. Therefore, the invention provides unified access to multiple types of databases by providing a common application programming interface.

The invention also enables maintaining of network connections. After a connection to a back-end database, for example, from a server or other device is established, the connection to the back-end database may be maintained. Therefore, if a user cancels a connection to a server, a connection between the server and the back-end database may be maintained. Thus, if a user reconnects to the server and requests additional information from the back-end database, the server does not need to reconnect to the back-end database because the previous connection has been maintained. Therefore, processing time is reduced because reconnection time may not be necessary. The server may determine whether an open connection exists for one or more particular devices, for example, by maintaining a list of open connections. Therefore, if the server receives a request for information from a database or other device, the server may check the list of open connections and determine whether a connection to that database or device exists. If a determination is made that a connection is open, the server may use that connection to satisfy the request. This reduces a need for a server to reestablish a connection to a particular device on numerous occasions.

The invention also enables searching using extended regular expressions and Unicode strings in the spirit of UNIX eGREP(1) command. For example, a search may be performed on ASCII strings that include a three (3) digit code. ASCII strings may include key 001, key 002, and key 003. A search may be performed on the ASCII strings using an extended regular expression that may be arbitrarily complex. For example, a search expression may be "key00 [12]". A search of the ASCII strings using this expression may yield key001 and key002.

Additionally, Unicode strings may also be searched. Unicode string searches may be SQL-like statements. For example, a Unicode string search may be "text". This enables searches of exact Unicode strings.

The invention may also include a memory debugging feature. The feature may be implemented using, for example, seven levels of diagnostic data, one level may be an environmental "M" option. Setting this option may cause all LAVPs to be set to a particular format when the LAVP is freed from memory. This may be used to increase the likelihood that an LAVP is not referenced after it is free. The debugging option may also include an environmental "L" option that causes loose object detection. This option may cause an LAVLs application programming interface to maintain a list of every LAVP that is not in an LAVL. The debugging feature may also include an option that disables an internal object identifier look aside buffer. The look aside buffer may be used to increase the performance of an LAVP locator function. If a loose object detection option is enabled, the system may display contents of a loose object list that may be invoked at any time. This may provide several levels of diagnostic data that may facilitate locating objects and their creation. Objects may automatically be placed onto and removed from a loose object list whenever a parent pointer is made non-null or null, respectively.

Figure 6A:
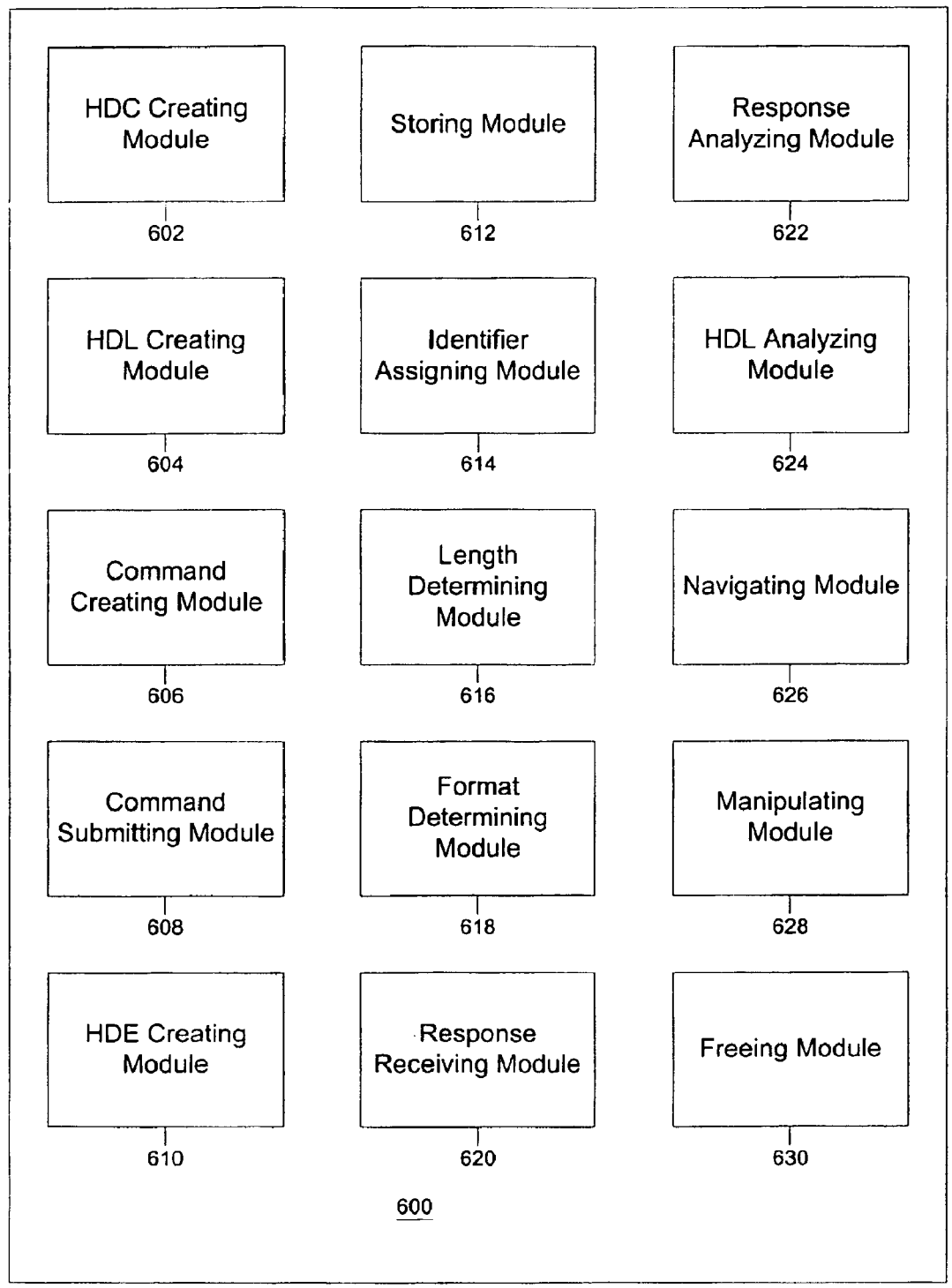
FIG. 6A is a schematic block diagram of a client-side system for managing HDLs according to one embodiment of the invention.

FIG. 6A illustrates a system 600 for managing one or more HDLs. System 600 may include an HDC creating module 602, HDL creating module 604, command creating module 606, command submitting module 608, and HDE creating module 610. HDC creating module 602 may be used to create an HDC to be stored within an HDL. If an HDL is created, HDL creating module 604 may be used to create the HDL. The HDCs and HDLs created, may be created using one or more commands input by a user. Command creating module 606 may be used to enable the user to create the commands for creating one or more HDCs and HDLs.

Command submitting module 608 may be used to submit the commands to a server for processing. Additionally, an HDE creating module 610 may be used to create one or more HDEs that may be included in one or more HDCs and HDLs.

After each HDC, HDE, and HDL is created, storing module 612 may be used to store the HDCs, HDEs, and HDLs at a location in memory of a client or other device. An identifier assigning module 614 may be used to assign an identifier to one or more HDLs.

As described above, an HDL may include a length field. Therefore, length determining module 616 may be used to determine a length of data stored by an HDL. A format determining module 618 may also be used to determine a format of the data stored by the HDL.

After one or more commands are submitted to a server by command submitting module 608, a response from the server may be received using response receiving module 620. A response analyzing module 622 may be used to analyze the response received from the server. The analysis may include determining whether the response includes one or more HDLs, whether the HDLs include one or more HDCs or HDEs, determining data stored by the HDLs, or other analysis.

If a determination is made that the response includes one or more HDLs, an HDL analyzing module 624 may be used to analyze the HDLs. The analysis may included determining whether the HDL includes one or more HDCs or HDEs, data stored by the HDL, or other analysis. Navigating module 626 may be used to navigate either forward or backward through an HDL. Manipulating module 628 may be used to manipulate one or more HDLs. Manipulating the HDLs may include joining two or more HDLs, weaving two or more HDLs, merging or adding two or more HDLs together, unchaining an HDC or HDE from and HDL, etc. A freeing module 630 may also be used to free an HDC, HDE, or HDL. Preferably, freeing an HDC, HDE, or HDL includes removing the HDC, HDE, or HDL from an HDL. This may be equivalent to a delete operation.

Figure 6B:
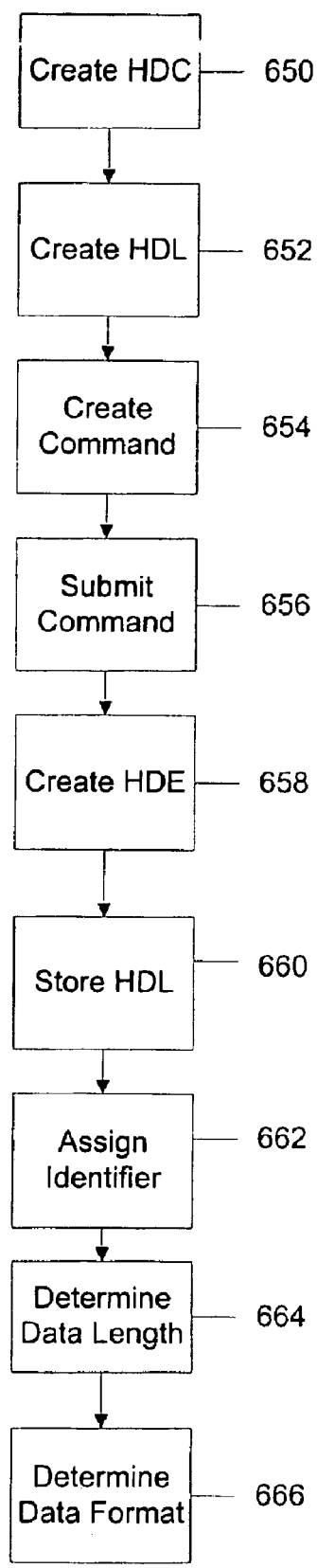
FIG. 6B is a schematic block diagram of a method for managing HDLs according to one embodiment of the invention.

FIG. 6B illustrates a method for managing HDLs according to one embodiment of the invention. The method may include a create HDC step 650. Step 650 may be used to create one or more HDCs. A create HDL step 652 may then be used to create one or more HDLs. The HDLs may include one or more of the HDCs created using step 650. A create command step 654 may be used to create a command that stores data in the HDCs. In step 656, the command created using step 654 may be submitted to, for example, a server.

A create HDE step 658 can then be used to create one or more HDEs. The HDEs may be included in an HDC and/or HDL. In step 660, the HDL may be stored to, for example, an object store. In assign identifier step 662 may be used to assign an identifier to the HDL stored. Steps 664 and 666 may be used to determine a length and format of data in the HDL stored.

Figure 7:
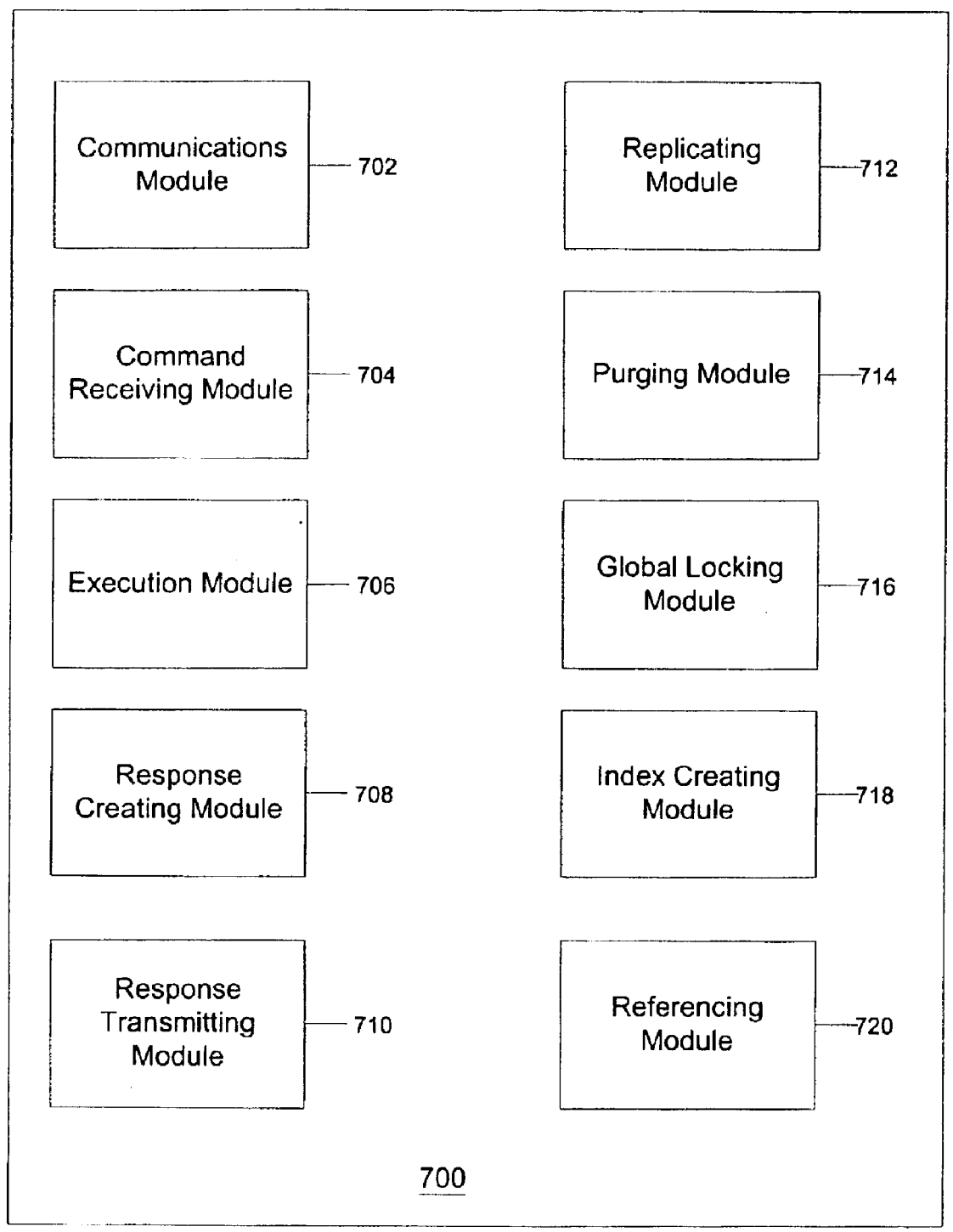
FIG. 7 is a schematic block diagram of a server-side system for managing HDLs according to one embodiment of the invention.

FIG. 7 illustrates a server 700 that may be used for managing HDLs. Server 700 may include a communications module 702, command receiving module 704, execution module 706, response creating module 708, response transmitting module 710, replicating module 712, purging module 714, global locking module 716, index creating module 718, and referencing module 720. Communications module 702 may be used to communicate with one or more clients. The communications are preferably transmitted over a network, for example, the Internet. The communications may use any known communication method.

Command receiving module 704 may be used to receive one or more commands from a client. Execution module 706 may execute the commands received by command receiving module 704. Response creating module 708 may then create a response to the commands received and executed by execution module 706. Response transmitting module may transmit the response to the client.

Replicating module 712 may be used to replicate one or more HDLs, HDCs, or HDEs. Replication may be performed in response to a command received from a client by command receiving module 704. Purging module 714 may also be used to purge one or more HDLs, HDCs, or HDEs. Purging may include deleting an HDL, HDC, or HDE from a memory of server 700. Global locking module 716 may be used to prevent access to one or more HDLs by a particular user. For example, global locking module 716 may prohibit one or more users from accessing the HDL. Global locking module 716 may prohibit access based on attributes stored within a user profile or provided in an HDL.

Index creating module 718 may be used to create an index based on one or more HDLs. Any HDCs or HDEs included in an HDL may be used for creating an index of HDCs or HDEs included in each HDL. Index creating module 718 may create multiple indexes upon creation of an HDL. Therefore, if one HDL is created, multiple inserts may be created in an index by index creating module 718. Referencing module 720 may be used to reference, for example, one or more back-end databases. The back-end databases may include an LDAP, Oracle, or DB2 database. Referencing module 720 may enable an entire database to be referenced by an HDL. For example, an HDL may include an HDC that references an Oracle database. Therefore, when the HDL that references the Oracle database is requested, the Oracle database is retrieved along with the HDL requested. This reduces the number of calls that may be necessary for retrieving the Oracle database. Thus, the HDL requested and the Oracle database are retrieved using a single call.

Figure 8:
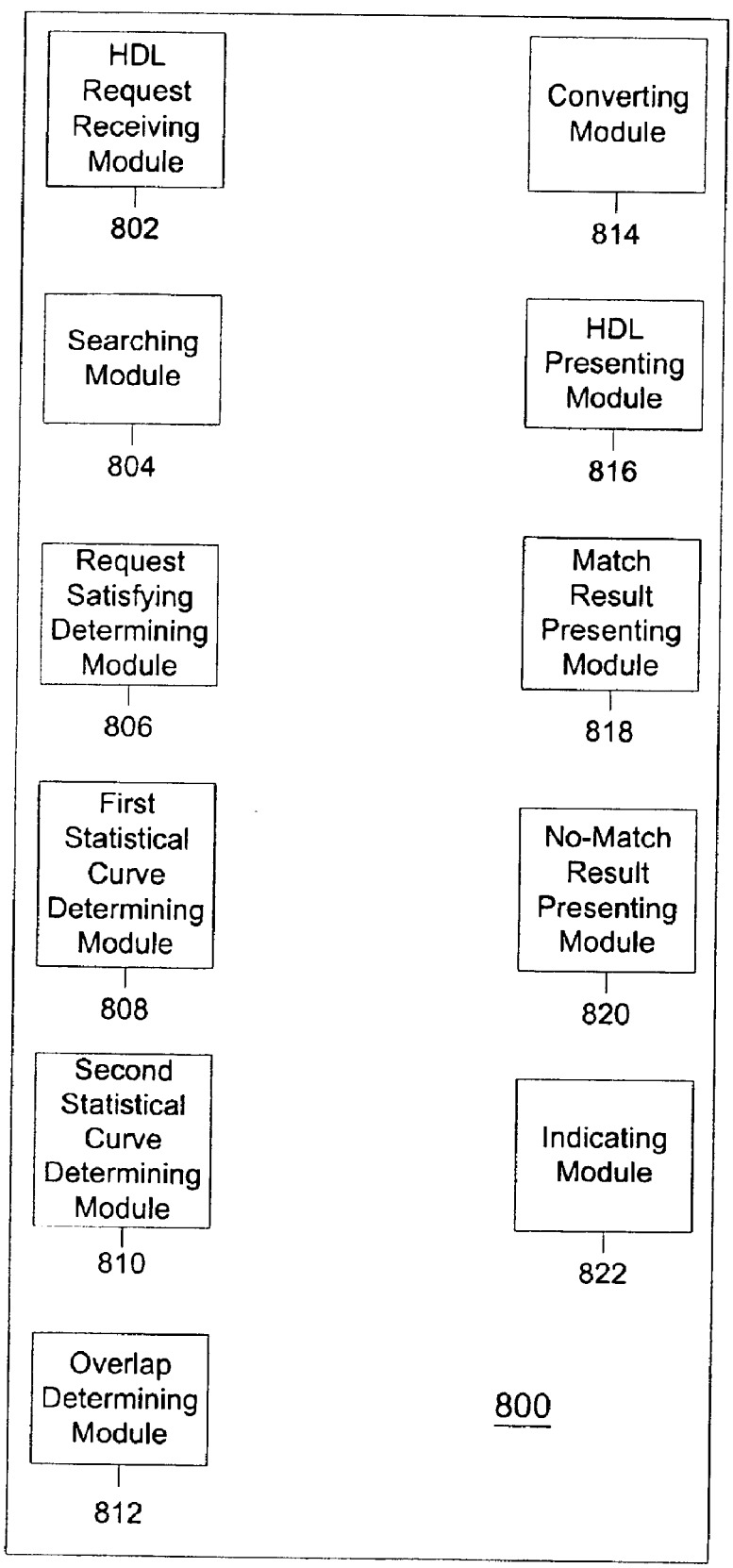
FIG. 8 is a schematic block diagram of a system for statistical matching according to one embodiment of the invention.

FIG. 8 illustrates a system 800 for statistical matching according to one embodiment of the invention. System 800 may include an HDL request received in the module 802, searching module 804, requests satisfying determining module 806, first statistical curve determining module 808, second statistical curve determining module 810, overlap determining module 812, converting module 814, HDL presenting module 816, match result presenting module 818, non-match result presenting module 820, and indicating module 822. HDL request receiving module 802 may be used to receive a request for one or more HDLs. Searching module 804 may then search, for example, an object store, for one or more HDLs satisfying the request. Request satisfying determining module 806 may be used to determine whether one or more HDLs in the object store satisfy the requests. If a determination is made that one or more HDLs satisfy the request, first statistical curve determining module 808 may be used to determine a statistical curve for HDLs described by the request.

Second statistical curve determining module 810 may then be used to determine a statistical curve for one or more HDLs stored by the object store that satisfy the request. Overlap determining module 812 may be used to determine whether any overlap exists between the first statistical curve and the second statistical curve. The statistical curves may assume a normal distribution. Any overlap between the two curves may be defined as a percentage match by a user. For example, a user may define overlap between the two statistical curves and a match indicating a match of 95%.

Converting module 814 may be used to convert units presenting in a request to a common set of units. For example, if a request indicates that HDLs describing bricks weighing in a certain range of grams, converting module 814 may convert the grams to, for example, pounds, to coincide with units for weight stored by the object store. HDL presenting module 816 may then be used to present one or more HDLs that satisfy the request. Alternatively, a match result or non-match result may be presented using modules 818 or 820, respectively. Indicating module 822 may also be used to indicate a closeness of HDLs matching the request. For example, indicating module may indicate that three-hundred (300) of five-hundred (500) HDLs satisfied the request.

Figure 9:
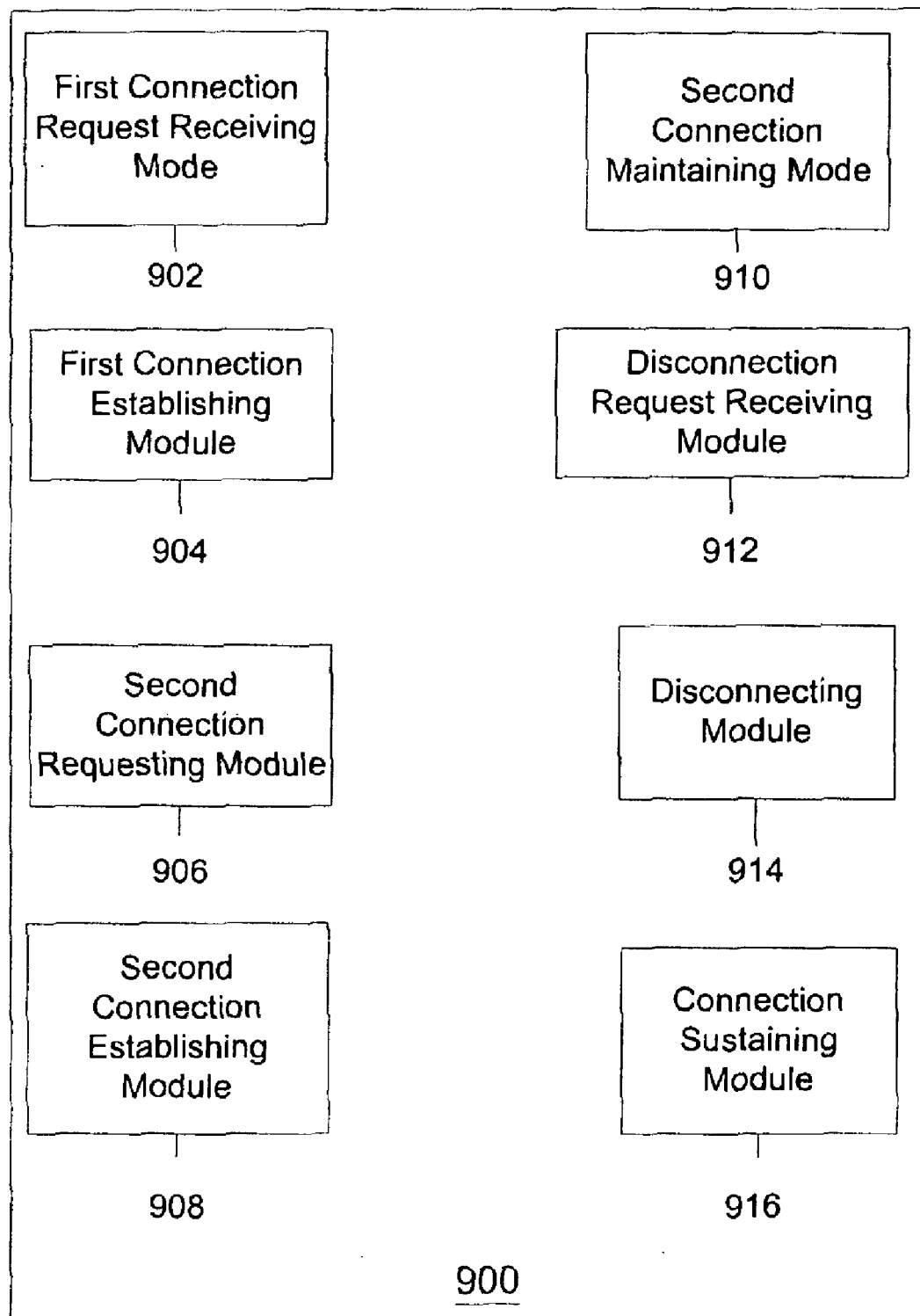
FIG. 9 is a schematic block diagram of a system for caching a network connection according to one embodiment of the invention.

FIG. 9 illustrates a system 900 for caching a network connection. System 900 may include a first connection request receiving module 902, first connection establishing module 904, second connection requesting module 906, second connection establishing module 908, second connection maintaining module 910, disconnection request receiving module 912, disconnecting module 914, and connection sustaining module 916. First connection request receiving module 902 may be used to receive a connection request from, for example, a client device, at a server. First connection establishing module 904 may be used to establish a connection between the client device and the server. Second connection requesting module 906 may then be used to request a second connection from the server to an end device, for example, a database. Second connection establishing module 908 may then be used to establish a second connection between the server and the database. Second connection maintaining module 910 may be used to maintain a record of connections established between the server and an end device. For example, the record may be a list of open connections between the server and other end devices.

Disconnection request receiving module 912 may be used to receive a disconnection request from a client device. Disconnecting module 914 may be used to disconnect the connection between the client device and the server. Although the connection between the client device and the server may be disconnected, connection sustaining module 916 may be used to sustain the connection between the server and the end device. Therefore, if a first connection request is received after a connection between a client device and a server has been disconnected, and a client device request information from an end device to which the server is already connected, the server may not be required to reestablish the connection with the end device. In this manner the server maintains open connections with end devices for a predetermined period of time. This reduces connection time and does not require a server to reestablish connections with end devices each time a request is received for information from a particular end device.

Figure 10:
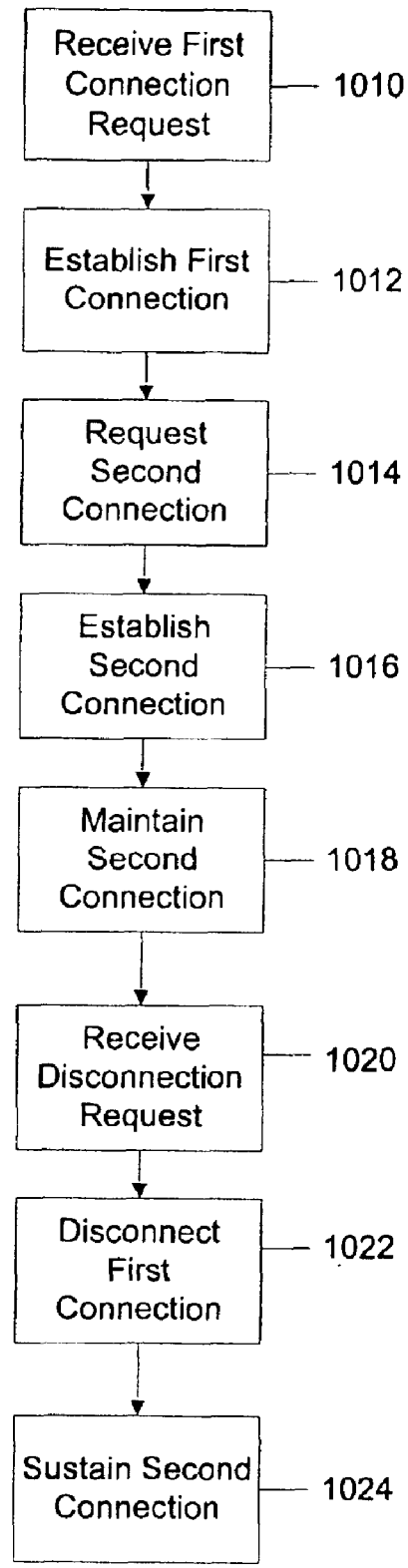
FIG. 10 is a schematic block diagram of a method for caching a network connection according to one embodiment of the invention.

FIG. 10 is an illustration of a method for caching in a network connection. The method may include a receive first connection request 1010. Step 1010 may receive a first connection request from a client device at a server. In step 1012, a first connection may be established between the client device and the server. In step 1014, the server may request a second connection between the server and an end device. For example, the server may have received a search request from the client device to search, for example, a back end database. Therefore, the server may need to request a connection to the back end database. Step 1016 may be used to establish the second connection between the server and the back end database. In step 1018, a second connection record may be maintained for open connections between the server and the back end database and any other end devices.

In step 1020, the server may receive a disconnection request from the client device. Step 1022 may be used to disconnect the first connection between the client device and the server. Step 1024 may be used, however, to sustain the second connection between the server and back end database and other end devices. In this manner, if a server receives a request to perform an operation at a back end database or other end device to which the server has previously established a connection, the server may not be required to reestablish the connection. A search of the second connection record may be performed to determine whether a connection has previously been established and whether that connection has been sustained. If a search of the connection record determines that a connection to the particular end device requested, the server may use that open connection instead of requesting another connection to the end device. This reduces connection time.

Figure 11:
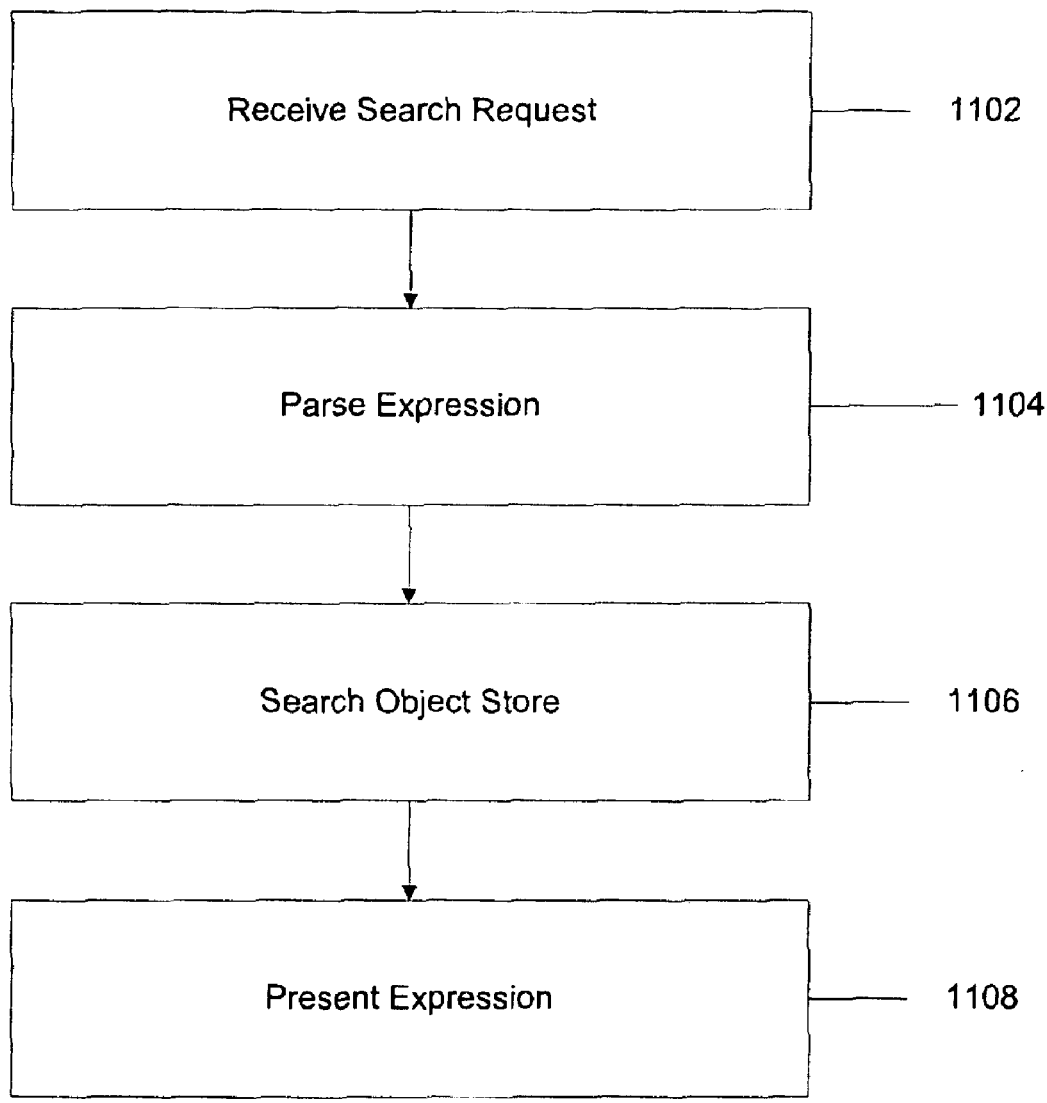
FIG. 11 is a schematic block diagram of a method for searching extended regular expressions according to one embodiment of the invention.

FIG. 11 illustrates a method for searching extended regular expressions according to one embodiment of the invention. The method may include a receive search request step 1102. Step 1102 may be used to receive an extended regular expression search request from one or more users. In step 1104, the extended regular expression provided in the search request may be parsed to determine particular elements of the expression for which to search An object store may then be searched to locate extended regular expressions satisfying the search request in step 1106. If one or more extended regular expressions that satisfy the search request are located, step 1108 may be used to present the extended regular expressions to the user.

Figure 12:
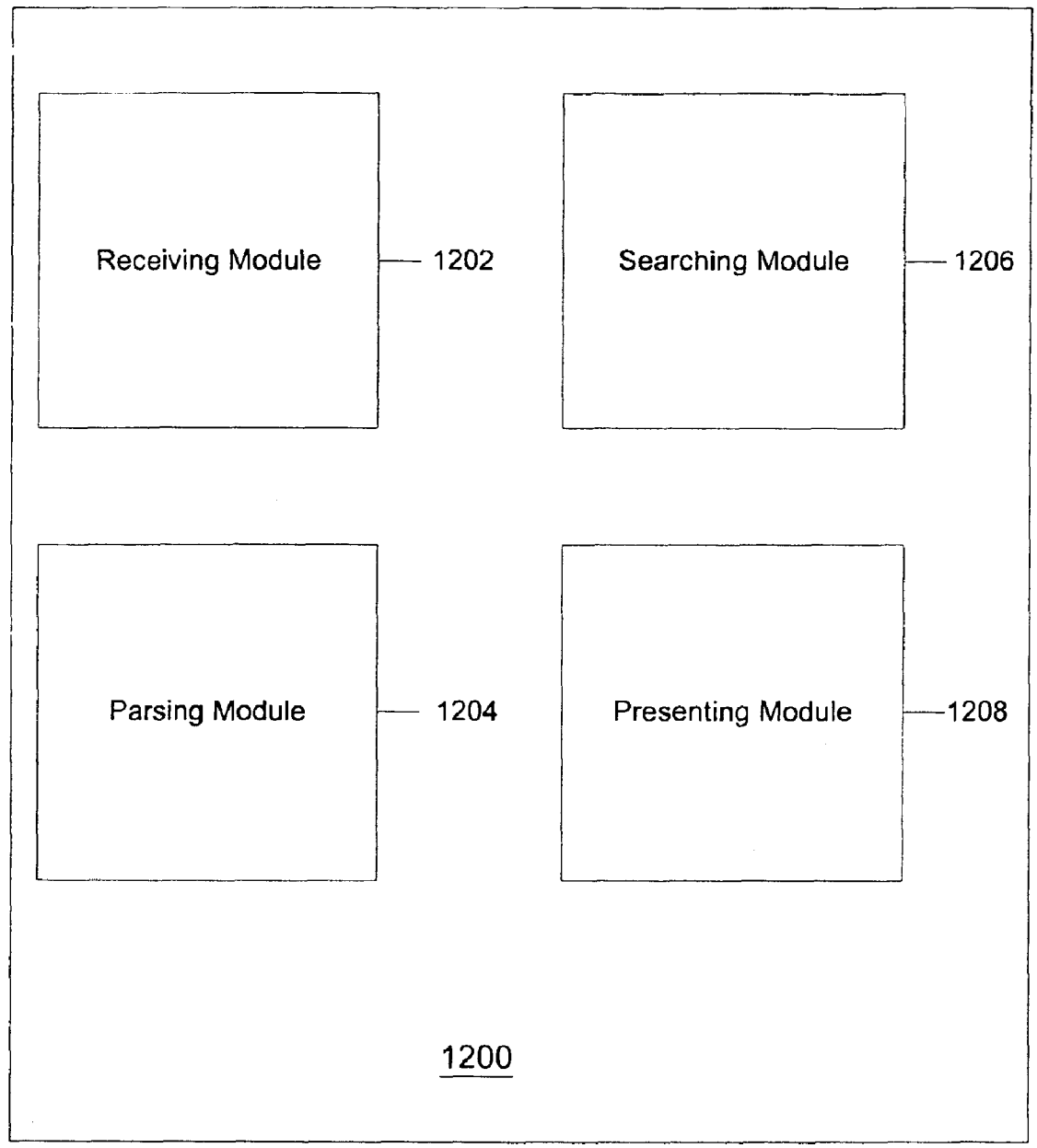
FIG. 12 is a schematic block diagram of a system for searching extended regular expressions according to one embodiment of the invention.

FIG. 12 is an illustration of a system 1200 for searching extended regular expressions. System 1200 may include a receiving module 1202, parsing module 1204, searching module 1206, and presenting module 1208. Receiving module 1202 may be used to receive one or more search requests for extended regular expressions from one or more users. Parsing module 1204 may be used to parse the extended regular expressions provided in the search request to determine particular elements of the extended regular expression for which to search. Presenting module 1208 may then be used to present any extended regular expression located as a result of the search.

Figure 13:
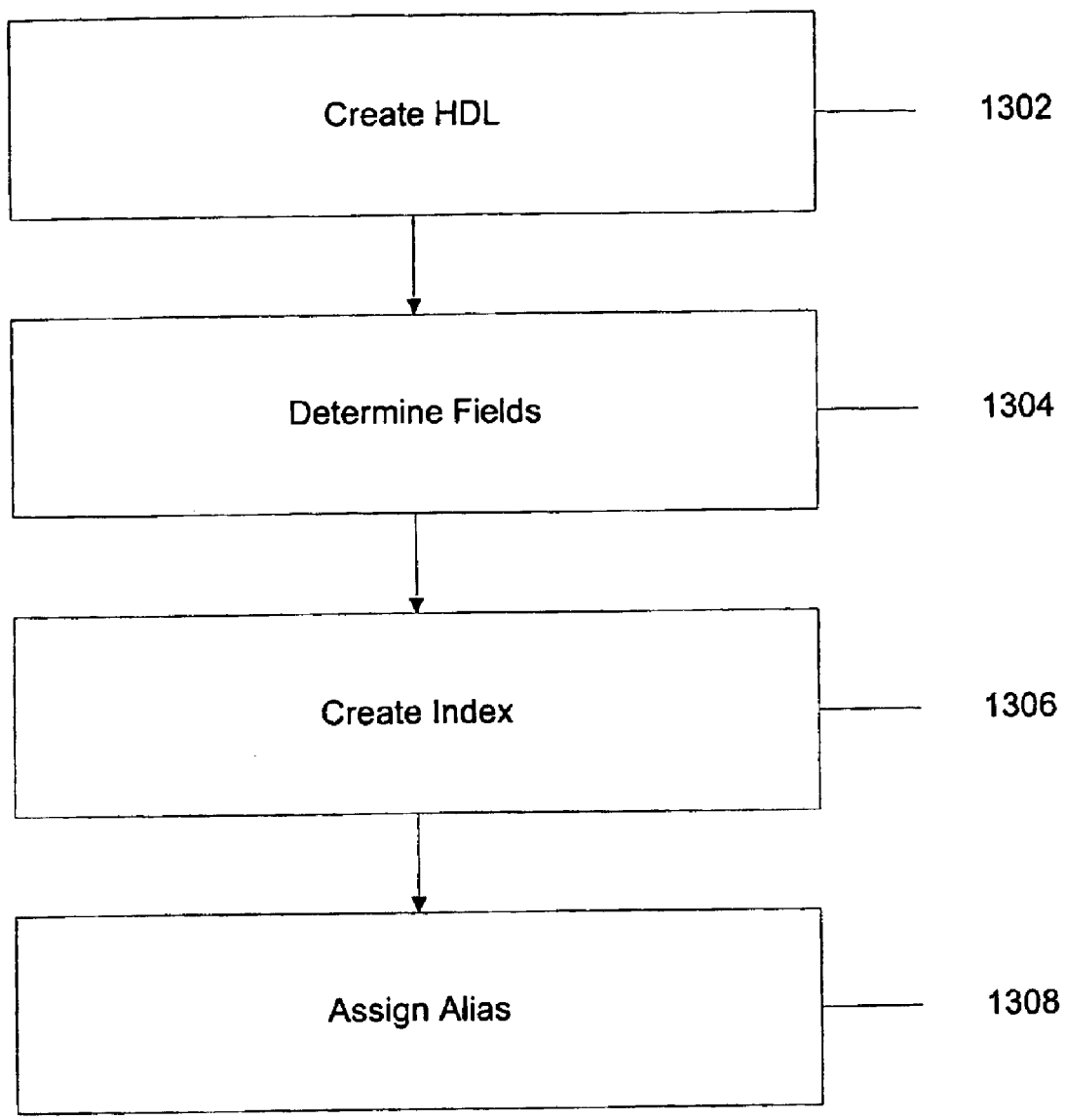
FIG. 13 is a schematic block diagram of a method for multi-indexing of objects according to one embodiment of the invention.

FIG. 13 is an illustration of a method for multi-indexing of objects. A create HDL step 1302 may be used to create one or more HDLs. After creating the HDLs, step 1304 may be used to determine one or more fields included in the HDLs. Based on the fields determined in step 1304, step 1306 may be used to create an index of data included in the fields. Step 1306 may create multiple indexes based on a single HDL created. For example, data contained in the fields may be used to create multiple indexes based on a type of index created. For example, for HDLs that include personal information of one or more users, indexing may be created based on first name, last name, gender, or other criteria. Therefore, an index may be created for each criteria After creating an index, step 1308 may be used to assign an alias to data contained within the fields. An alias may be, for example, an HDL containing that data.

Figure 14:
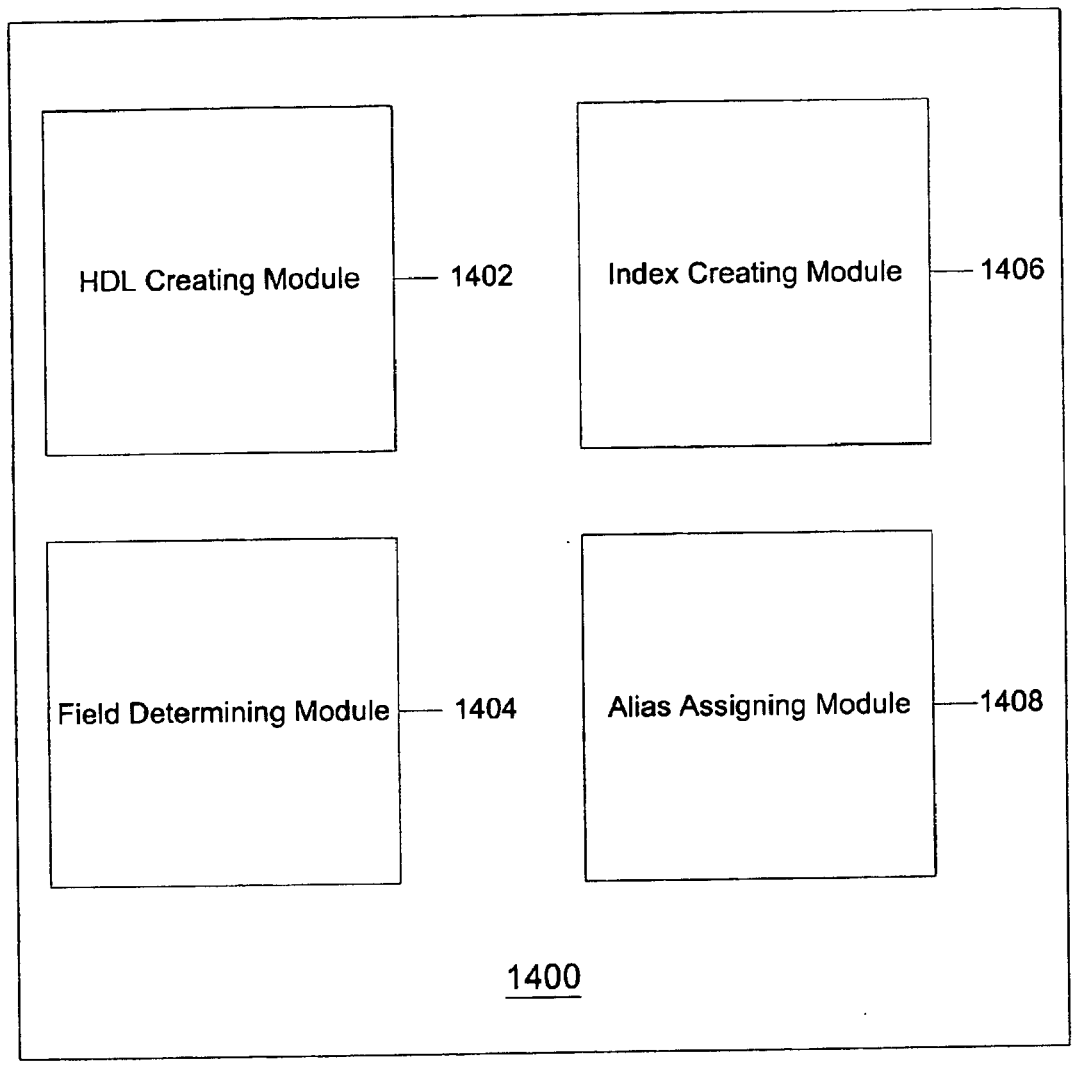
FIG. 14 is a schematic block diagram of a system for multi-indexing of objects according to one embodiment of the invention.

FIG. 14 is an illustration of a system 1400 for multi-indexing of objects. System 1400 may include an HDL creating module 1402, field determining module 1404, index creating module 1406, and alias assigning module 1408. HDL creating module 1402 may be used to create one or more HDLs. After the HDLs are created, field determining module 1404 may be used to determine the fields contained within the HDLs. Index creating module 1406 may then be used to create one or more indexes based on the fields determined by field determining module 1404. Data included within the fields may be indexed according to a variety of criteria. Alias assigning module 1408 may be used to assign an alias for the data indexed. The alias may refer to the HDL that includes that data.

Figure 15:
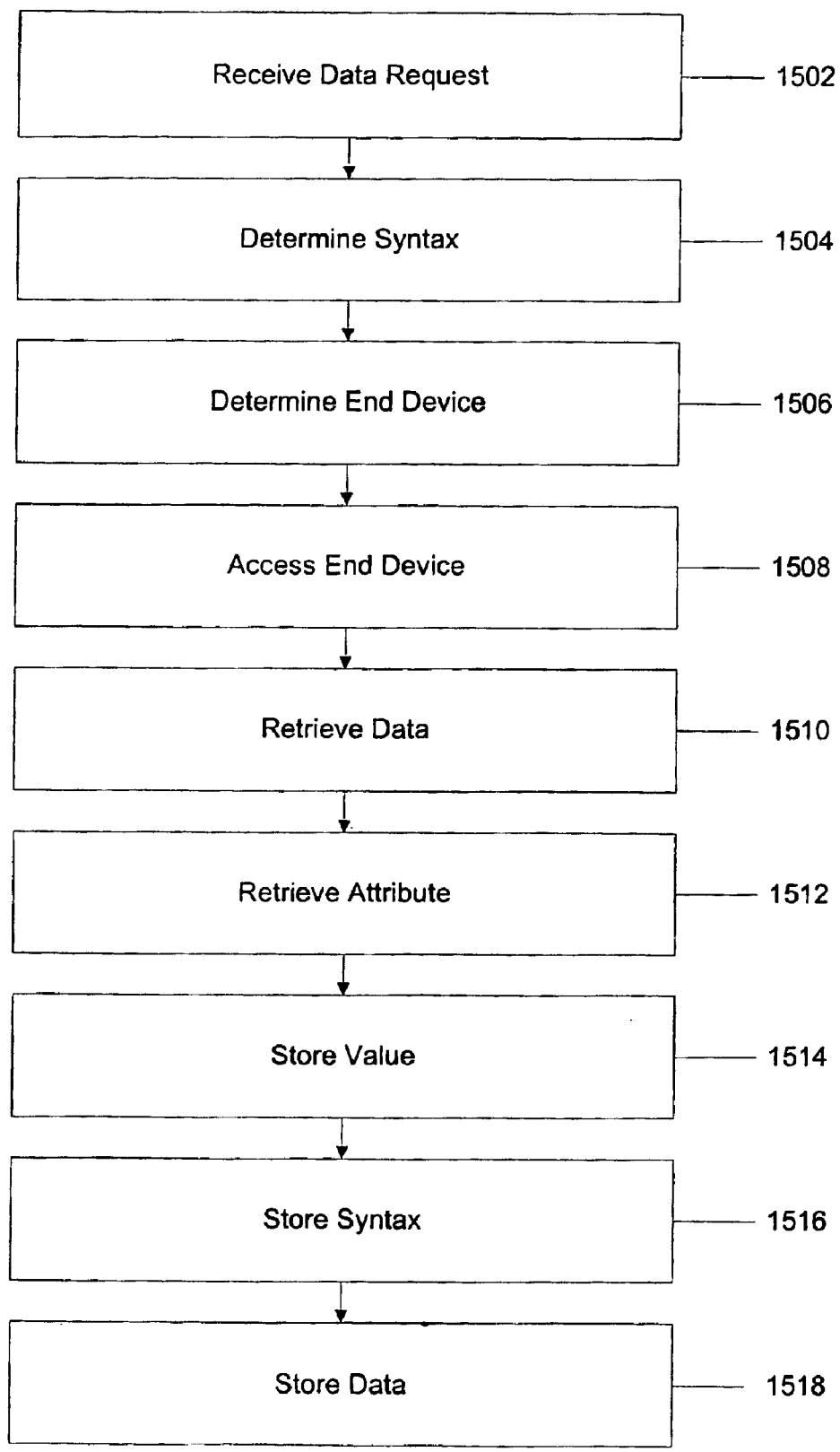
FIG. 15 is a schematic block diagram of a method for enabling unified access to multiple data types according to one embodiment of the invention.

FIG. 15 illustrates a method for enabling unified access to multiple data types. The method may include a receive data request step 1502. In step 1502, a server or other device may receive one or more data requests from one or more users. A determine syntax step 1504 may be used to determine a syntax of the data requested. Step 1506 may then be used to determine an end device from which the data requested may be retrieved. After determining the end device, step 1508 may be used to access that end device. The data may then be retrieved in step 1510. Step 1512 may also be used to retrieve an attribute of the data. Preferably, the attribute is retrieved based on an attribute number assigned to the attribute.

Step 1514 may then be used to store a value of the data. The syntax of the data may also be stored in step 1516. Step 1518 may be used to store the data which may include the value and the syntax. The data may be stored as a character string.

Figure 16:
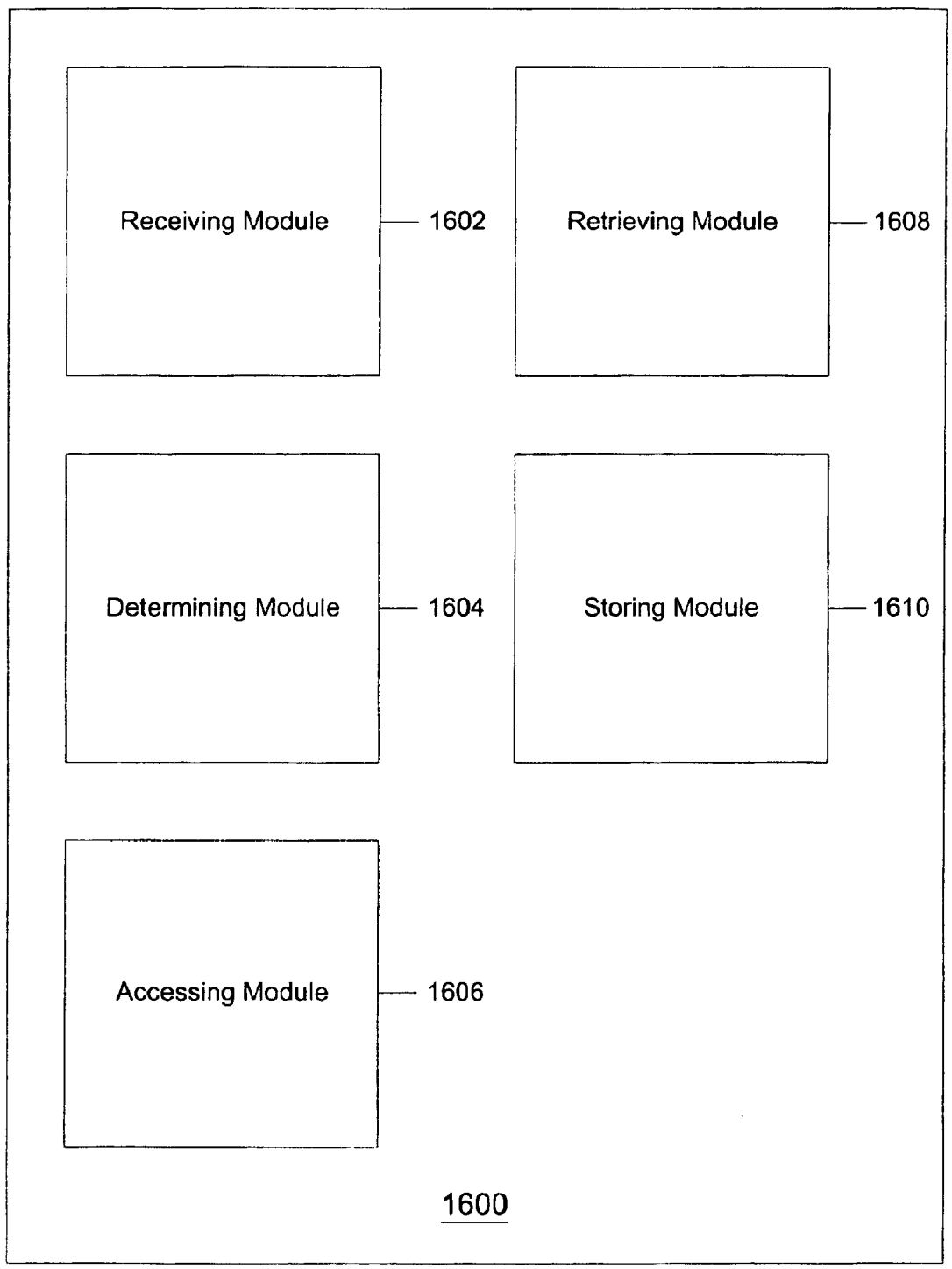
FIG. 16 is a schematic block diagram of a system for enabling unified access to multiple data types according to one embodiment of the invention.

FIG. 16 illustrates a system 1600 for enabling unified access to multiple data types. System 1600 may include a receiving module 1602, determining module 1604, accessing module 1606, retrieving module 1608, and storing module 1610. Receiving module 1602 may be used to receive one or more data requests from one or more users. Determining module 1604 may be used to determine an end device from which the data requested may be retrieved. After determining the end device, accessing module 1606 may be used to access the end device. Retrieving module 1608 may then be used to retrieve the data requested and possibly an attribute of the data. After retrieving the data and possible attribute, storing module 1610 may be used to store the data and attribute.

The foregoing description of a system and method for storing hierarchical objects is illustrative, and changes in the above construction and sequences of operation may occur to persons skilled in the art. For example, although multiple modules are shown for carrying out the invention, additional or fewer modules may be used and multiple modules may be positioned in various locations. The scope of the invention is accordingly intended to be limited only by the following claims.

What is claimed is:

1. A method for caching a network connection, comprising the steps of:
   receiving a connection request for at least one first connection between at least one terminal and a server;
   establishing the at least one first connection between the at least one terminal and the server;
   requesting at least one second connection between the server and at least one database, wherein the database includes at least one self defining entity, the self defining entity including at least one of a hierarchical data list, a hierarchical data element, and a hierarchical data container;
   establishing the at least one second connection;
   retrieving the at least one self defining entity from the at least one database via the second connection; and
   maintaining a record of the at least one second connection established.

2. The method of claim 1, further comprising the step of receiving a disconnection request for the at least one first connection from the at least one terminal.

3. The method of claim 2, further comprising the step of disconnecting the at least one first connection.

4. The method of claim 3, further comprising the step of sustaining the at least one second connection after the at least one first connection has been disconnected.

5. The method of claim 1, wherein the record includes a list of established second connections.

6. A system for caching a network connection, comprising:
   connection request receiving means for receiving a connection request for at least one first connection between at least one terminal and a server;
   connection establishing means for establishing the at least one first connection between the at least one terminal and the server;
   connection requesting means for requesting at least one second connection between the server and at least one database, wherein the database includes at least one self defining entity, the self defining entity including at least one of a hierarchical data list, a hierarchical data element, and a hierarchical data container;
   connection establishing means for establishing the at least one second connection;
   data retrieval means for retrieving the at least one self defining entity from the at least one database via the second connection; and
   maintaining means for maintaining a record of the at least one second connection established.

7. The system of claim 6, further comprising disconnection request receiving means for receiving a disconnection request for the at least one first connection from the at least one terminal.

8. The system of claim 7, further comprising disconnecting means for disconnecting the at least one first connection.

9. The system of claim 8, further comprising connection sustaining means for sustaining the at least one second connection after the at least one first connection has been disconnected.

10. The system of claim 6, wherein the record includes a list of established second connections.

11. A system for caching a network connection, comprising:
    a connection request receiving module that receives a connection request for at least one first connection between at least one terminal and a server;

a connection establishing module that establishes the at least one first connection between the at least one terminal and the server;

a connection requesting module that requests at least one second connection between the server and at least one database, wherein the database includes at least one self defining entity, the self defining entity including at least one of a hierarchical data list, a hierarchical data element, and a hierarchical data container;

a connection establishing module that establishes the at least one second connection;

a data retrieval module that retrieves the at least one self defining entity from the at least one database via the second connection; and a connection maintaining module that maintains a record of the at least one second connection established.

12. The system of claim 11, further comprising a disconnection request receiving module that receives a disconnection request for the at least one first connection from the at least one terminal.

13. The system of claim 12, further comprising a disconnecting module that disconnects the at least one first connection.

14. The system of claim 13, further comprising a connection sustaining module that sustains the at least one second connection after the at least one first connection has been disconnected.

15. The system of claim 11, wherein the record includes a list of established second connections.

16. A processor readable medium comprising processor readable code for caching a network connection, comprising:

connection request receiving code that causes a processor to receive a connection request for at least one first connection between at least one terminal and a server;

connection establishing code that causes a processor to establish the at least one first connection between the at least one terminal and the server;

connection requesting code that causes a processor to request at least one second connection between the server and at least one database, wherein the database includes at least one self defining entity, the self defining entity including at least one of a hierarchical data list, a hierarchical data element, and a hierarchical data container;

connection establishing code that causes a processor to establish the at least one second connection;

data retrieval code that causes a processor to retrieve the at least one self defining entity from the at least one database via the second connection; and connection maintaining code that causes a processor to maintain a record of the at least one second connection established.

17. The medium of claim 16, further comprising disconnection request receiving code that causes a processor to receive a disconnection request for the at least one first connection from the at least one terminal.

18. The medium of claim 17, further comprising connection disconnecting code that causes a processor to disconnect the at least one first connection.

19. The medium of claim 18, further comprising connection sustaining code that causes a processor to sustain the at least one second connection after the at least one first connection has been disconnected.

20. The medium of claim 16, wherein the record includes a list of established second connections.

* * * * *